(12) United States Patent
Ogasawara

(10) Patent No.: US 7,242,510 B2
(45) Date of Patent: Jul. 10, 2007

(54) ABERRATION CORRECTION ELEMENT, OPTICAL PICKUP, AND INFORMATION EQUIPMENT

(75) Inventor: Masakazu Ogasawara, Saitama (JP)

(73) Assignee: Pioneer Corporation, Tokyo (JP)

( * ) Notice: Subject to any disclaimer, the term of this patent is extended or adjusted under 35 U.S.C. 154(b) by 9 days.

(21) Appl. No.: 11/178,500

(22) Filed: Jul. 12, 2005

(65) Prior Publication Data

US 2006/0012847 A1    Jan. 19, 2006

(30) Foreign Application Priority Data

Jul. 13, 2004   (JP) .............................. 2004-206176

(51) Int. Cl.
G02F 1/01       (2006.01)
G02F 1/1343     (2006.01)
G11B 7/00       (2006.01)
G09G 3/36       (2006.01)

(52) U.S. Cl. ...................... 359/279; 359/245; 349/139; 349/143; 349/146; 349/147; 369/44.23; 369/112.02; 345/104; 345/87

(58) Field of Classification Search ................ 359/279, 359/15, 16, 245, 252–254, 586, 247, 248, 359/464, 466, 475; 349/146, 156, 187, 200, 349/38, 39, 42, 96, 116, 117, 123, 139, 143, 349/147; 369/112.01, 112.02, 112.12, 112.16, 369/53.2, 44.11, 44.17, 44.22, 44.23, 44.27; 250/216; 345/87, 104, 182, 213

See application file for complete search history.

(56) References Cited

U.S. PATENT DOCUMENTS

| | | | | |
|---|---|---|---|---|
| 4,448,490 A | * | 5/1984 | Shibuya et al. ............... 349/82 |
| 5,321,535 A | * | 6/1994 | Ukai et al. ..................... 349/85 |
| 5,430,462 A | * | 7/1995 | Katagiri et al. ............. 345/104 |
| 5,576,863 A | * | 11/1996 | Aoki et al. .................. 349/124 |
| 5,608,556 A | * | 3/1997 | Koma .......................... 349/143 |
| 5,610,739 A | * | 3/1997 | Uno et al. ..................... 349/39 |
| 6,327,013 B1 | * | 12/2001 | Tombling et al. ........... 349/139 |
| 6,344,713 B1 | * | 2/2002 | Awaji et al. ................. 313/582 |
| 6,449,236 B2 | * | 9/2002 | Wals et al. ............. 369/112.02 |
| 6,469,822 B1 | * | 10/2002 | Zhu ............................. 359/316 |
| 6,480,454 B1 | * | 11/2002 | Wada et al. ........... 369/112.02 |
| 6,661,415 B1 | * | 12/2003 | Yasuda et al. .............. 345/213 |
| 6,678,232 B2 | * | 1/2004 | Ogasawara et al. .... 369/112.02 |
| 6,690,500 B2 | * | 2/2004 | Ogasawara et al. ......... 359/245 |
| 6,774,967 B2 | * | 8/2004 | Kim et al. ................... 349/129 |

(Continued)

FOREIGN PATENT DOCUMENTS

JP      2001-176180      6/2001

*Primary Examiner*—Loha Ben
(74) *Attorney, Agent, or Firm*—Nixon & Vanderhye, PC

(57) ABSTRACT

An aberration correction element is intended to correct an aberration. The aberration correction element is placed in a middle of an optical path between a light source and an optical element for focusing a light on the information recording medium. The aberration correction element is provided with: a first electrode; a liquid crystal element; second electrodes which are arranged in a form of multiple layers in a direction of the optical axis; and outgoing lines for individually applying a voltage to the second electrodes. At least one of second electrodes is placed between the outgoing line for applying the voltage to another second electrode other than one second electrode which is placed on the closest side to the liquid crystal element and the liquid crystal element which faces the outgoing line in the direction of the optical axis;

38 Claims, 14 Drawing Sheets

U.S. PATENT DOCUMENTS

| | | |
|---|---|---|
| 6,778,246 B2 * | 8/2004 | Sun et al. .................. 349/146 |
| 6,859,429 B2 * | 2/2005 | Ogasawara et al. .... 369/112.02 |
| 6,909,686 B2 * | 6/2005 | Iwasaki et al. ........ 369/112.02 |
| 6,987,598 B2 * | 1/2006 | Wada et al. ................. 359/254 |
| 7,031,247 B2 * | 4/2006 | Yasuda et al. ......... 369/112.02 |
| 7,054,253 B1 * | 5/2006 | Nomura et al. ........ 369/112.02 |

* cited by examiner

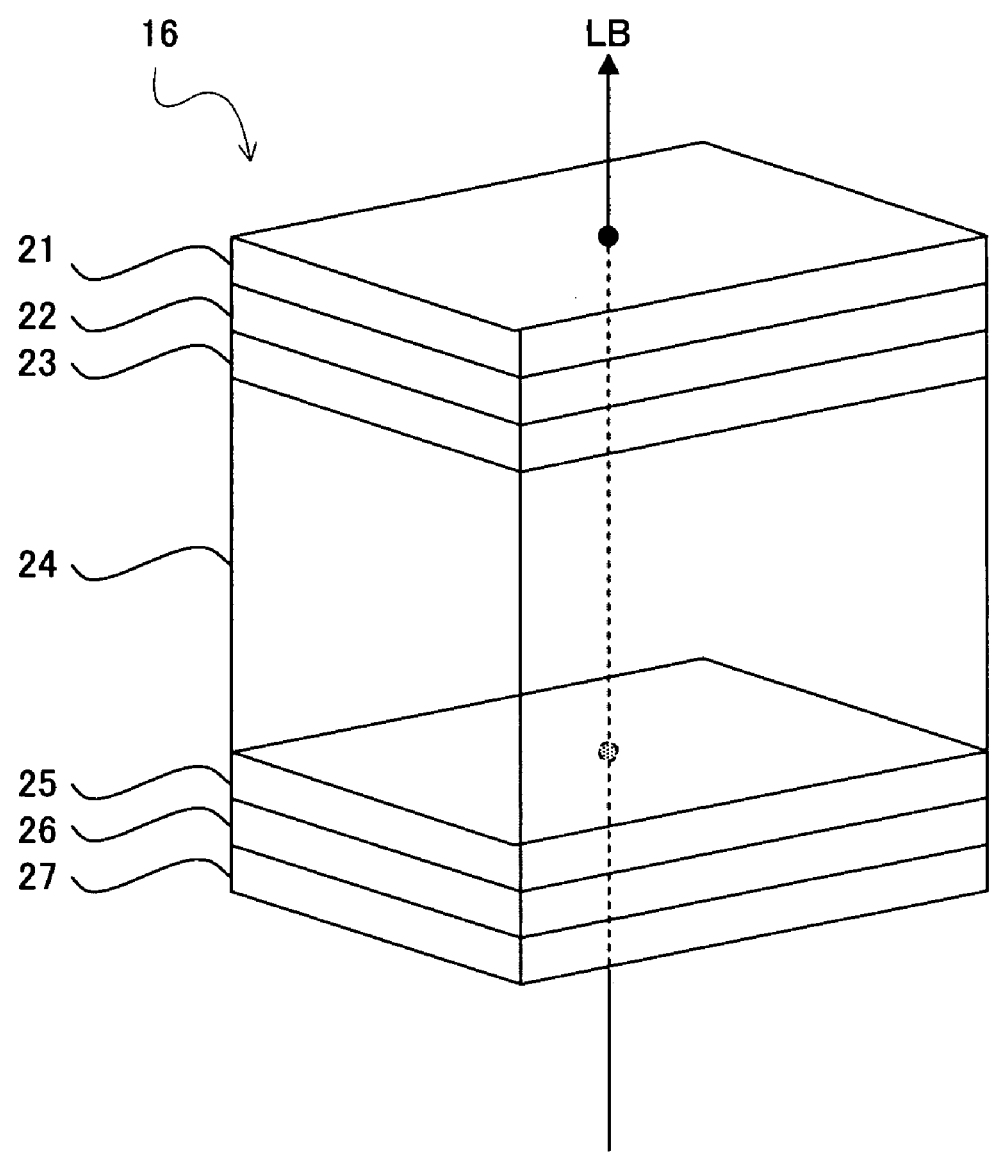

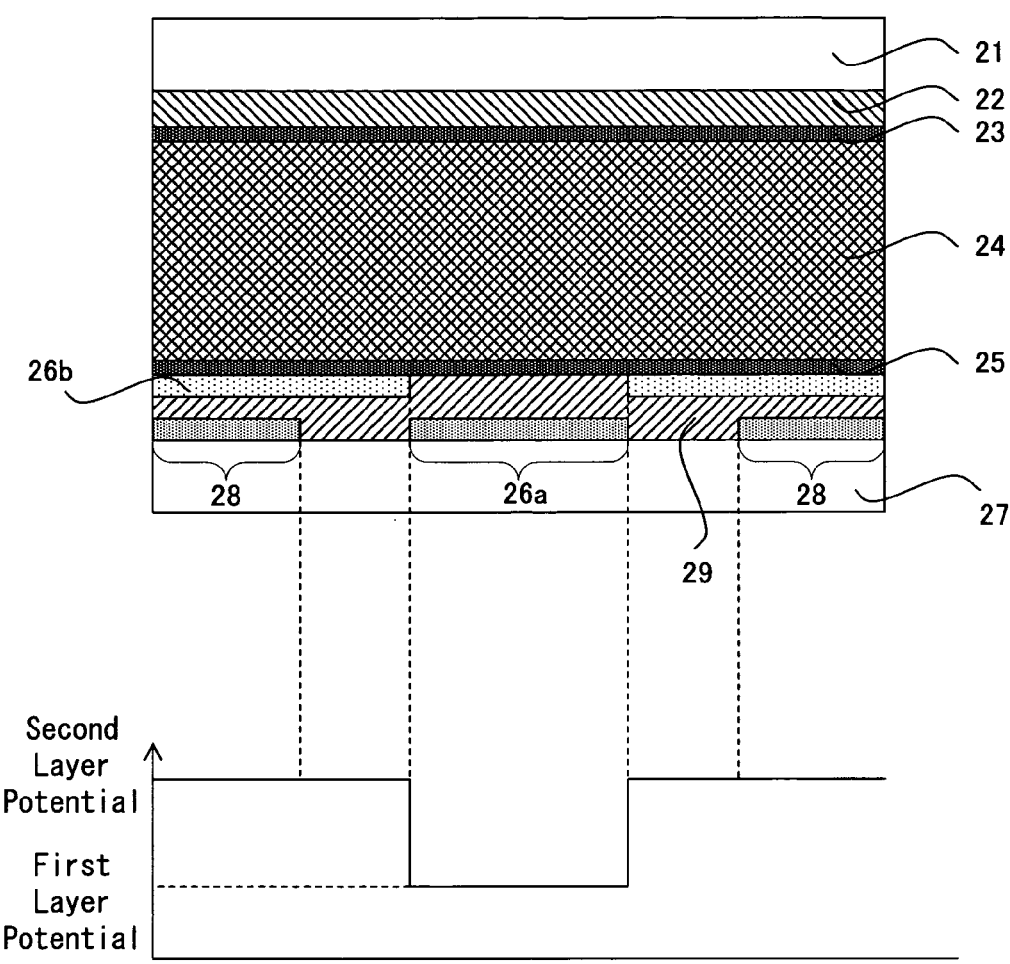

ABERRATION CORRECTION ELEMENT, OPTICAL PICKUP, AND INFORMATION EQUIPMENT

BACKGROUND OF THE INVENTION

1. Field of the Invention

The present invention relates to an aberration correction element for making an aberration correction in recording or reproducing information with respect to an information recording medium, such as a DVD, and an optical pickup and an information equipment which are provided with the aberration correction element.

2. Description of the Related Art

An information recording medium on which the data is recorded or reproduced by using laser light or the like has been developed, which is, for example, a CD, a DVD, or the like. In such optical recording or reproduction of the data by using the laser light, it is hardly possible to appropriately perform the recording and reproduction if the influence of coma aberration or spherical aberration or the like is not eliminated.

In order to correct the coma aberration, which is caused by the presence of the tilt of the information recording medium, an a laser element which emits laser light has been developed, for example. Moreover, there has been recently developed an optical pickup that eliminates the influence of the coma aberration and the spherical aberration, more preferably, by using an aberration correction element which uses the change of the refractive index of a liquid crystal element. Furthermore, in order to correct the spherical aberration more preferably, which is unevenly caused in the range of the irradiation spot of the laser light, an optical pickup that uses an aberration correction element having such a structure that a liquid crystal element is sandwiched by a plurality of multilayer electrodes has been developed by the inventors of the present invention and the like (refer to Japanese Patent Application Laid Open No. 2001-176180).

SUMMARY OF THE INVENTION

However, with respect to the aberration correction element having such a structure that the liquid crystal element is sandwiched by the plurality of electrodes, it is necessary to provide outgoing lines (i.e. electrode wires) for applying the voltage to the plurality of electrodes. In this case, the outgoing lines are provided in a range of about 10 μm to 20 μm in width, for example, depending on the shape of the plurality of electrodes, which varies in accordance with the pattern of the aberration to be corrected. Moreover, in designing the shape of the plurality of electrodes and the outgoing lines, it is necessary to provide an insulating portion which is about 5 μm wide, on the border of the plurality of electrodes and the outgoing lines. However, the aberration correction element has such a technical problem that the outgoing line and the insulating portion likely have an adverse effect, optically, as a physical gap. Specifically, in some cases, a portion with such a gap (particularly, a portion with the outgoing line and the border) may be widen, substantially 10 μm to 30 μm wide, which causes that the aberration correction element functions as a diffraction grating having optically high diffractive efficiency at the portion. In this case, there is such a problem that the laser light which transmits through the gap portion is diffracted at the gap portion which is equal to the diffraction grating, so that the information recording medium cannot be preferably irradiated with the laser light.

It is therefore an object of the present invention to provide: an aberration correction element that can make an aberration correction more preferably, and an optical pickup and an information equipment which are provided with the aberration correction element.

The above object of the present invention can be achieved by a first aberration correction element for correcting an aberration, said aberration correction element being placed along an optical axis of a light in a middle of an optical path between a light source and an optical element for focusing the light emitted from the light source on the information recording medium, said aberration correction element comprising: a liquid crystal element; a first electrode; a plurality of second electrodes which mutually face said first electrode, with said liquid crystal element being sandwiched between said first electrode and said second electrodes, and which are arranged in a form of multiple layers in a direction of the optical axis; and a plurality of outgoing lines for individually applying a voltage to said plurality of second electrodes, at least one of said plurality of second electrodes being placed between said outgoing line for applying the voltage to another second electrode other than one second electrode which is placed on the closest side to said liquid crystal element, out of said plurality of second electrodes, and at least one portion of said liquid crystal element which faces said outgoing line for applying the voltage to the another second electrode in the direction of the optical axis.

According to the first aberration correction element of the present invention, the refractive index of the liquid crystal element is changed by applying a predetermined voltage (or an electric field or the like) to the liquid crystal element with the first electrode and the second electrodes. As a result, it is possible to correct the aberration of the light which transmits thorough the aberration correction element. Moreover, the first aberration correction element is provided with the plurality of second electrodes having a multilayer structure. The first aberration correction element is provided with the plurality of outgoing lines each of which can make an electrical connection with at least corresponding one of the second electrodes, in order to apply a voltage to the plurality of second electrodes. Namely, corresponding one or a plurality of outgoing lines is connected with one certain second electrode or a plurality of second electrodes.

Particularly, in the first aberration correction element, at least one second electrode is placed between the outgoing line for applying the voltage to the another second electrode and the liquid crystal element (or the first electrode). Particularly, the second electrode which is originally intended to apply an electric field to the liquid crystal element is placed between the outgoing line and the liquid crystal element (or one portion thereof) located in the direction of the optical axis from the outgoing line. Because of this placement of the second electrode, an electric field is not applied to the liquid crystal element from the outgoing line. Namely, even if a voltage is applied to the outgoing line, a voltage is applied to the liquid crystal from the second electrode which is placed closer to the liquid crystal element. As a result, the refractive index of the liquid crystal element is adjusted, in accordance with the voltage applied from the second electrode. Therefore, it is possible to effectively prevent or inhibit such a disadvantage that an unnecessary or wrong voltage is applied to the liquid crystal element from the outgoing line.

By this, there are such advantages that it is possible to preferably adjust the refractive index of the liquid crystal element, and that an unnecessary phase difference is not given to the light which transmits through the aberration correction element. Therefore, it is possible to preferably correct the aberration with respect to the light which transmits through the aberration correction element.

Incidentally, the outgoing line for applying the voltage to the above-described one second electrode does not necessarily have to have the above-described structure. Namely, by determining the shape of the outgoing line, which applies the voltage to the one second electrode, in accordance with the preferable application pattern of a voltage to the liquid crystal element, it is possible to receive the above-described various benefits even if the second electrode is not placed between the outgoing line which applies the voltage to the one second electrode and the liquid crystal element. Depending on the shape of the outgoing line and the application pattern of the voltage, the second electrode may be placed between the outgoing line which applies the voltage to the one second electrode and the liquid crystal element.

The above object of the present invention can be also achieved by a second aberration correction element for correcting an aberration, said aberration correction element being placed along an optical axis of a light in a middle of an optical path between a light source and an optical element for focusing the light emitted from the light source on the information recording medium, said aberration correction element comprising: a liquid crystal element; a first electrode; a plurality of second electrodes which mutually face said first electrode, with said liquid crystal element being sandwiched between said first electrode and said second electrodes, and which are arranged in a form of multiple layers in a direction of the optical axis; and a plurality of outgoing lines for individually applying a voltage to said plurality of second electrodes, said outgoing line for applying the voltage to another second electrode other than one second electrode which is placed on the closest side to said liquid crystal element, out of said plurality of second electrodes, being formed in a space other than a space between at least one portion of each of said plurality of second electrodes where the voltage is to be applied and said first electrode.

According to the second aberration correction element of the present invention, as in the case of the first aberration correction element described above, the refractive index of the liquid crystal element is changed by applying a predetermined voltage (or an electric field, an electric current, or the like) to the liquid crystal element with the first electrode and the second electrodes. As a result, it is possible to correct the aberration of the light which transmits through the aberration correction element.

Particularly, in the second aberration correction element, the outgoing line for applying the voltage to the another second electrode is formed in a space (i.e. an area) other than a space between the second electrode, where the voltage is originally to be applied and thus which is intended to apply an electric field to the liquid crystal element, and the first electrode. Namely, in a space between the second electrode, where the voltage is originally to be applied and thus which is intended to apply an electric field to the liquid crystal element, there is not formed the outgoing line for applying the voltage to the another second electrode. Therefore, an electric field is not applied to the liquid crystal element from the outgoing line, effectively. Namely, even if a voltage is applied to the outgoing line, a desired voltage is applied to the liquid crystal from the first electrode and each of the second electrodes. As a result, the refractive index of the liquid crystal element is adjusted, in accordance with the voltage applied from the first electrode and the second electrode. Therefore, it is possible to effectively prevent or inhibit such a disadvantage that an unnecessary or wrong voltage is applied to the liquid crystal element from the outgoing line.

By this, there are such advantages that it is possible to preferably adjust the refractive index of the liquid crystal element, and that an unnecessary phase difference is not given to the light which transmits through the aberration correction element. Therefore, it is possible to preferably correct the aberration with respect to the light which transmits through the aberration correction element.

Moreover, as described later, the first electrode provided for the first or second aberration correction element may have the same structure as that of the second electrodes of the first or second aberration correction element.

In one aspect of the second aberration correction element of the present invention, each of the plurality of outgoing lines is formed in a space other than between at least one portion of each of the plurality of second electrodes where the voltage is to be applied and the first electrode.

According to this aspect, an electric field is not applied to the liquid crystal element from each of the plurality of outgoing lines, so that it is possible to preferably apply a voltage between the first electrode and the second electrodes. As a result, it is possible to correct the aberration, preferably.

In another aspect of the second aberration correction element of the present invention, at least one of the plurality of second electrodes is placed between the outgoing line for applying the voltage to the another second electrode and at least one portion of the liquid crystal element which faces the outgoing line for applying the voltage to the another electrode in the direction of the optical axis.

According to this aspect, it is possible to more effectively prevent or inhibit such a disadvantage that an unnecessary or wrong voltage is applied to the liquid crystal element from the outgoing line. As a result, it is possible to correct the aberration, more preferably.

In another aspect of the first or second aberration correction element of the present invention, a distance between another outgoing line other than one outgoing line that is intended to apply the voltage to the one second electrode, out of the plurality of outgoing lines, and the liquid crystal element is longer than a distance between at least one of the plurality of second electrodes and the liquid crystal element.

According to this aspect, it is possible to avoid such a disadvantage, relatively easily, that a voltage is applied from the outgoing line, in an area where the voltage is originally to be applied from the second electrode to the liquid crystal element.

In another aspect of the first or second aberration correction element of the present invention, at least one of the plurality of second electrodes is placed between each of the plurality of outgoing lines and at least one portion of the liquid crystal element which faces the each of the outgoing lines in the direction of the optical axis.

According to this aspect, an electric field is not applied to the liquid crystal element from each of the plurality of outgoing lines, so that it is possible to preferably apply a voltage between the first electrode and the second electrodes. As a result, it is possible to correct the aberration, preferably.

In another aspect of the first or second aberration correction element of the present invention, a distance between each of the plurality of outgoing lines and the liquid crystal element is longer than a distance between the plurality of second electrodes and the liquid crystal element.

According to this aspect, all of the plurality of outgoing lines are placed farther from the liquid crystal element, as compared to the second electrodes. Therefore, it is possible to avoid such a disadvantage, relatively easily, that a voltage is applied from the outgoing line, in an area where the voltage is originally to be applied from the second electrode to the liquid crystal element.

In another aspect of the first or second aberration correction element of the present invention, at least one of the plurality of second electrodes is unified with the outgoing line for applying the voltage to the at least one of the second electrodes.

According to this aspect, it is possible to relatively simplify the structure of the aberration correction element by unifying the second electrode and the outgoing line.

In another aspect of the first or second aberration correction element of the present invention, an insulating layer is placed between the plurality of second electrodes.

According to this aspect, even if the plurality of second electrodes are provided, it is possible to preferably apply a different voltage to the liquid crystal element from each of the second electrodes.

In an aspect of the first or second aberration correction element provided with the insulating layer as described above, a through hole for connecting each of the plurality of second electrodes with one of the plurality of outgoing lines corresponding to each of the plurality of second electrodes may be formed in the insulating layer.

By virtue of such a construction, even if the insulating layer is provided, it is possible to electrically connect the plurality of outgoing lines and the plurality of second electrodes, through the through hole or holes, in association with each other, as occasion demands. Thus, it is possible to preferably apply a voltage to each of the plurality of second electrodes.

In another aspect of the first or second aberration correction element of the present invention, the plurality of second electrodes are individually aligned without a void for each other in the direction perpendicular to the optical axis.

According to this aspect, it is possible to preferably correct the aberration to the light which transmits through the aberration correction element.

In another aspect of the first or second aberration correction element of the present invention, at least two of the plurality of outgoing lines are electrically connected by a resistance line having a predetermined resistance value.

According to this aspect, by using a voltage drop in resistance lines, a larger number of different voltages can be applied to the liquid crystal element from the first electrode and the second electrodes with a smaller number of voltage control lines. Therefore, it is possible to correct the aberration, more preferably.

The above object of the present invention can be also achieved by a third aberration correction element for correcting an aberration, said aberration correction element being placed along an optical axis of a light in a middle of an optical path between a light source and an optical element for focusing the light emitted from the light source on the information recording medium, said aberration correction element comprising: a liquid crystal element; a plurality of first electrodes which are placed on a side of a front surface of said liquid crystal element and which are arranged in a form of multiple layers in a direction of the optical axis; a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and a plurality of outgoing lines for individually applying a voltage to said plurality of first electrodes and said plurality of second electrodes, at least one of said plurality of first electrodes being placed between said outgoing line for applying the voltage to another first electrode other than one first electrode which is placed on the closest side to the front surface of said liquid crystal element, out of said plurality of first electrodes, and at least one portion of said liquid crystal element which faces said outgoing line for applying the voltage to the another first electrode in the direction of the optical axis, at least one of said plurality of second electrodes being placed between said outgoing line for applying the voltage to another second electrode other than one second electrode which is placed on the closest side to the rear surface of said liquid crystal element, out of said plurality of second electrodes, and at least one portion of said liquid crystal element which faces said outgoing line for applying the voltage to the another second electrode in the direction of the optical axis.

The above object of the present invention can be also achieved by a fourth aberration correction element for correcting an aberration, said aberration correction element being placed along an optical axis of a light in a middle of an optical path between a light source and an optical element for focusing the light emitted from the light source on the information recording medium, said aberration correction element comprising: a liquid crystal element; a plurality of first electrodes which are placed on a side of a front surface of said liquid crystal element and which are arranged in a form of multiple layers in a direction of the optical axis; a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and a plurality of outgoing lines for individually applying a voltage to said plurality of first electrodes and said plurality of second electrodes, said outgoing line for applying the voltage to another first electrode other than one first electrode which is placed on the closest side to the front surface of said liquid crystal element, out of said plurality of first electrodes, being formed in a space other than between at least one portion of each of said plurality of first electrodes where the voltage is to be applied and each of said plurality of second electrodes, said outgoing line for applying the voltage to another second electrode other than one second electrode which is placed on the closest side to the rear surface of said liquid crystal element, out of said plurality of second electrodes, being formed in a space other than between at least one portion of each of said plurality of second electrodes where the voltage is to be applied and each of said plurality of first electrodes.

According to the third or fourth aberration correction element of the present invention, even if the first electrodes and the second electrodes, with the liquid crystal element being sandwiched between them, individually have a multilayer structure, it is possible to receive the same benefits as various benefits owned by the first or second aberration correction element described above.

Incidentally, in response to various aspects in the above-described first or second aberration correction element of the present invention, the third or fourth aberration correction element of the present invention can also adopt various aspects. Namely, as for the first electrodes of the third or fourth aberration correction element of the present invention, it is possible to adopt the various aspects provided for the first or second aberration correction element described above.

The above object of the present invention can be also achieved by an optical pickup comprising: one of the first to fourth aberration correction element of the present invention (including its various aspects); an emitting element for emitting the light; and a detection element for detecting the light.

According to the optical pickup of the present invention, while receiving the same benefits as the various benefits owned by the first, second, third or fourth aberration correction element of the present invention, it can irradiate a recording medium, such as an optical disc, with laser light or the like, and can detect the reflected light of the laser light or the like, for example.

The above object of the present invention can be also achieved by an information equipment comprising: one of the first to fourth aberration correction element of the present invention (including its various aspects); an optical pickup for performing at least one of emission and detection of the light; and a recording/reproducing device for performing at least one of recording or reproduction of data by irradiating a recording medium with the light.

According to the information equipment of the present invention, while receiving the same benefits as the various benefits owned by the first, second, third or fourth aberration correction element of the present invention, it can record the data onto a recording medium, such as an optical disc, and reproduce the data recorded on the recording medium.

The nature, utility, and further features of this invention will be more clearly apparent from the following detailed description with reference to preferred embodiments of the invention when read in conjunction with the accompanying drawings briefly described below.

As explained above, according to the first aberration correction element of the present invention, it is provided with: the liquid crystal element; the first electrode; the second electrodes; and the outgoing lines, at least one of the second electrodes being placed between the outgoing line for applying the voltage to another second electrode other than one second electrode which is placed on the closest side to the liquid crystal element, and the liquid crystal element which faces the outgoing line. According to the second aberration correction element of the present invention, it is provided with: the liquid crystal element; the first electrode; the second electrodes; and the outgoing lines, the outgoing line for applying the voltage to another second electrode other than one second electrode which is placed on the closest side to said liquid crystal element, being formed in a space other than between the second electrode where the voltage is to be applied and the first electrode. According to the third aberration correction element of the present invention, it is provided with: the liquid crystal element; the first electrodes; the second electrodes; and the outgoing lines, at least one of the first electrodes being placed between the outgoing line for applying the voltage to another first electrode other than one first electrode which is placed on the closest side to the liquid crystal element, and the liquid crystal element which faces the outgoing line, at least one of the second electrodes being placed between the outgoing line for applying the voltage to another second electrode other than one second electrode which is placed on the closest side to the liquid crystal element, and the liquid crystal element which faces the outgoing line. According to the fourth aberration correction element of the present invention, it is provided with: the liquid crystal element; the first electrode; the second electrodes; and the outgoing lines, the outgoing line for applying the voltage to another first electrode other than one first electrode which is placed on the closest side to said liquid crystal element, being formed in a space other than between the first electrode where the voltage is to be applied and the second electrode, the outgoing line for applying the voltage to another second electrode other than one second electrode which is placed on the closest side to said liquid crystal element, being formed in a space other than between the second electrode where the voltage is to be applied and the first electrode. Therefore, it is possible to effectively prevent or inhibit such a disadvantage that an unnecessary or wrong voltage is applied to the liquid crystal element from the outgoing line. Thus, it is possible to correct the aberration, more preferably.

BRIEF DESCRIPTION OF THE DRAWINGS

FIG. 2 is a perspective view showing the schematic structure of the aberration correction element in the embodiment;

FIG. 5 is a cross sectional view showing the aberration correction element in the embodiment;

DETAILED DESCRIPTION OF THE PREFERRED EMBODIMENTS

The embodiments of the present invention will be explained with reference to the drawings hereinafter.

At first, with reference to FIG. 1 to FIG. 7, the embodiment of an aberration correction element in the present invention will be explained.

Figure 1:
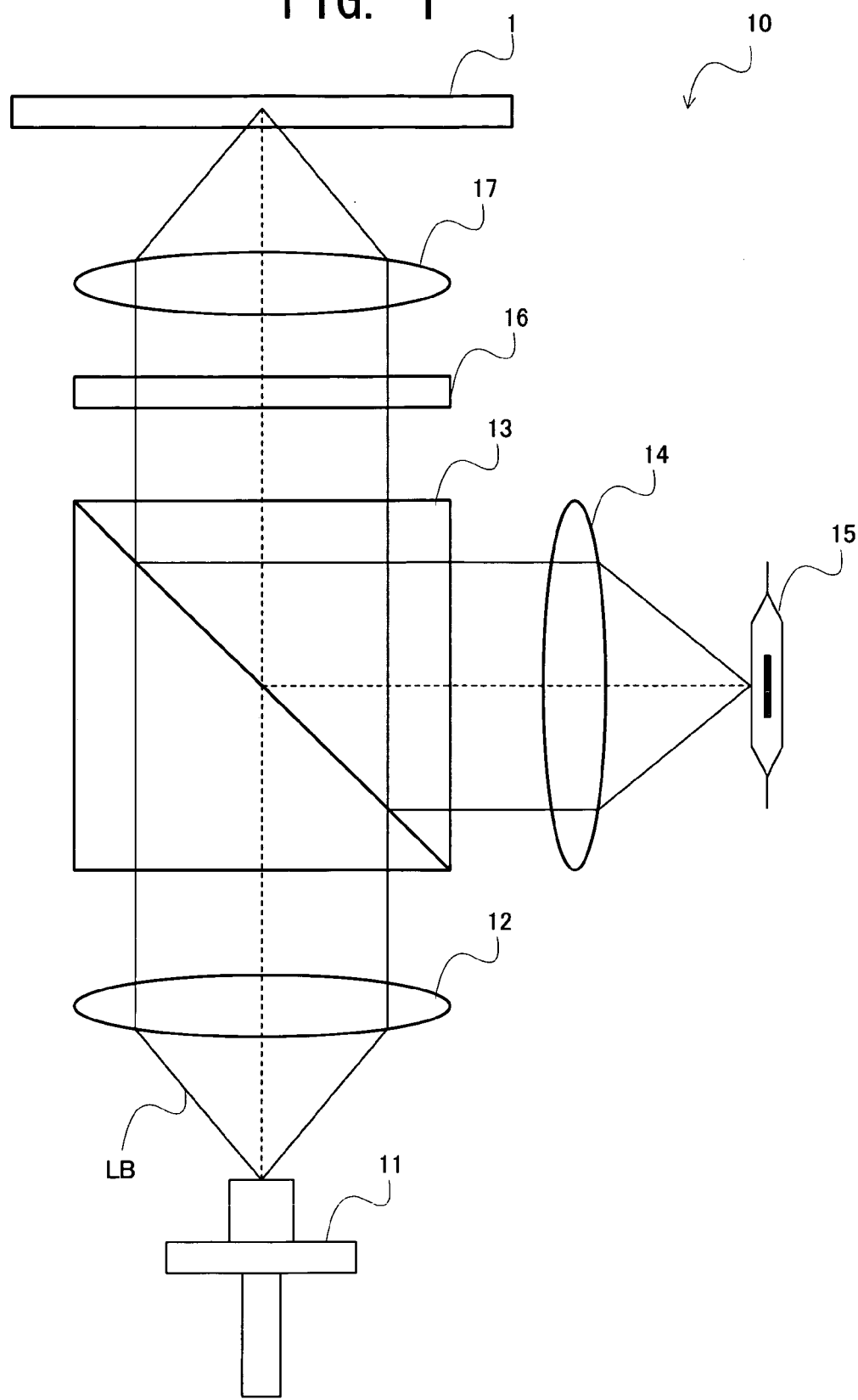
FIG. 1 is an explanatory diagram conceptually showing the structure of an optical pickup provided with an aberration correction element in an embodiment.

FIG. 1 shows the structure of an optical pickup provided with the aberration correction element in the embodiment. As shown in FIG. 1, an optical pickup 10 is provided with: a laser diode 11; an objective lens 12; a beam splitter 13; a collective lens 14; a photo detector 15; an aberration correction element 16 associated with the embodiment; and an objective lens 17.

Laser light LB emitted from the laser diode 11 transmits through the objective lens 12, the beam splitter 13, the aberration correction element 16, and the objective lens 17. Then, the recording surface of an optical disc 1 is irradiated with the laser light LB. At this time, an aberration correction which will be described later is made to the laser light LB when the laser light LB transmits through the aberration correction element 16. On the other hand, the laser light LB reflected on the recording surface of the optical disc 1 transmits through the objective lens 17 and the aberration correction element 16, and is reflected on the beam splitter 13. Then, it is concentrated (or condensed) on the photo detector 15 through the collective lens 14. The light with which the photo detector 15 is irradiated is optically converted into an electric signal. A reproduction signal, various servo error signals, and the like are generated from the electric signal.

The schematic structure of the aberration correction element 16 is shown in FIG. 2. As shown in FIG. 2, the aberration correction element 16 is provided with: a glass substrate 21; an ITO (Indium Tin Oxide) electrode 22 which is a transparent electrode; a liquid crystal oriented layer 23; a liquid crystal element 24; a liquid crystal oriented layer 25; an ITO electrode 26; and a glass substrate 27. These constituent elements are individually aligned along the optical axis direction of the laser light LB. By applying a predetermined voltage between the ITO electrode 22 and the ITO electrode 26, it is possible to change the oriented direction of liquid crystal molecules contained in the liquid crystal element 24 as occasion demands, which changes the refractive index of the liquid crystal element 24. By this, the optical path length of the laser light LB which transmits through the liquid crystal element 24 is changed, to thereby make an aberration correction.

Particularly in the embodiment, the ITO electrode 26 is constructed from ITO electrodes in a form of multi layers, which are aligned along the optical axis direction of the laser light LB. This structure will be described in detail later (refer to FIG. 3 etc.).

Incidentally, the aberration correction element 16 in the embodiment can change the optical path length of both of the laser light LB entered from the glass substrate 21 side and the laser light LB entered from the glass substrate 27 side. As a result, the aberration correction element 16 in the embodiment can make an aberration correction to the laser light LB which is entered from the both sides. Moreover, without limiting to the ITO electrode, it is possible to use other transparent electrodes, such as an IZO (Indium Zinc Oxide) electrode.

Figure 3A:
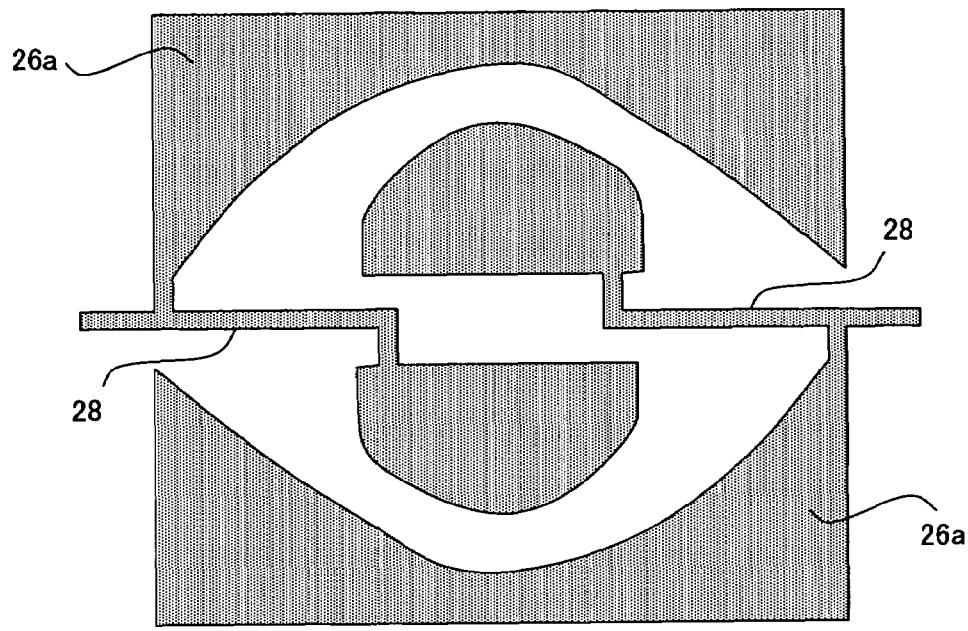
FIG. 3A and FIG. 3B are plan views showing the shapes of a plurality of ITO (Indium Tin Oxide) electrodes provided for the aberration correction element in the embodiment.
Figure 3B:
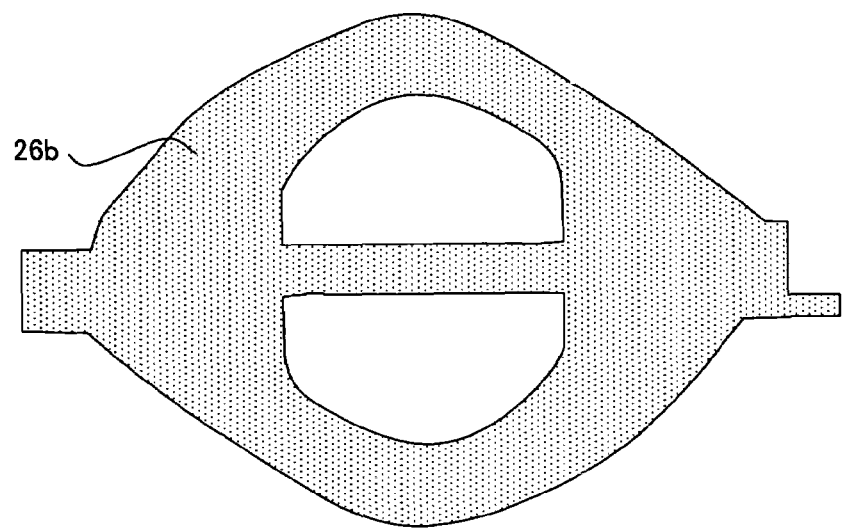
Figure 4:
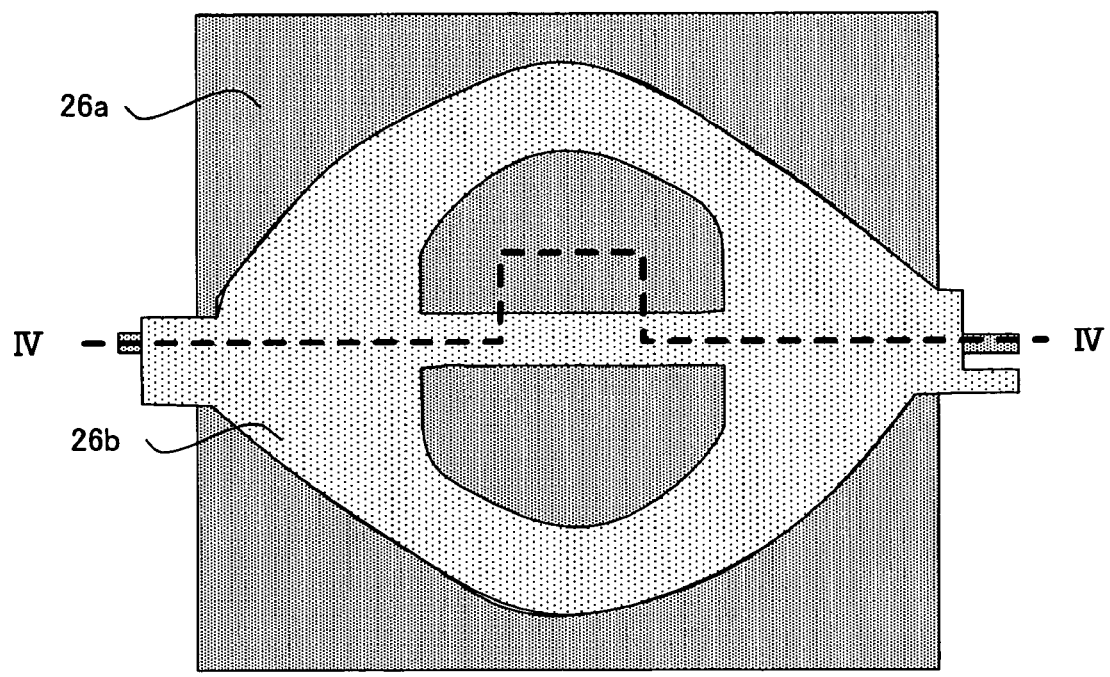
FIG. 4 is a plan view showing the shape of an electrode pattern constructed from the plurality of ITO electrodes.

Next, a more specific example of the aberration correction element 16 in the embodiment will be explained with reference to FIG. 3 to FIG. 5. FIG. 3A and FIG. 3B show the shapes of a plurality of ITO electrodes provided for the aberration correction element in the embodiment. FIG. 4 shows the shape of an electrode pattern constructed from the plurality of ITO electrodes. FIG. 5 shows the aberration correction element in the embodiment.

As shown in FIG. 3A, an ITO electrode 26a (hereinafter referred to as a "first-layer ITO electrode 26a", as occasion demands) which is placed on the side relatively far from the liquid crystal element 24 out of the ITO electrode 26 has two island-shaped electrode portions near the center, and there is no electrode portion in the vicinity of the two island-shaped electrode portions. The first-layer ITO electrode 26a further has an electrode portion around an empty portion where there is no electrode portion. The first-layer ITO electrode 26a has an outgoing line portion 28 for applying a voltage to each of the two island-shaped electrode portions.

On the other hand, as shown in FIG. 3B, an ITO electrode 26b (hereinafter referred to as a "second-layer ITO electrode 26b", as occasion demands) which is placed on the side relatively close to the liquid crystal element 24 out of the ITO electrode 26 has an electrode portion which has an opposite layout to that of the first-layer ITO electrode 26a. Namely, the second-layer ITO electrode 26b has an electrode portion in a portion corresponding to the empty portion of the first-layer ITO electrode 26a, and has an empty portion in a portion corresponding to the electrode portions of the first-layer ITO electrode 26a. More specifically, the second-layer ITO electrode 26b has the electrode portion with two island-shaped empty portions near the center.

The composition of the two ITO electrodes 26a and 26b realizes the shape of the electrode pattern, as shown in FIG. 4. Incidentally, the shape of the electrode pattern shown in FIG. 4 is an electrode arrangement pattern when the ITO electrodes 26a and 26b are observed from the liquid crystal element 24 side, and it is the same as a voltage application pattern.

As shown in FIG. 4, the second-layer ITO electrode 26b is placed closer to the liquid crystal element 24 than the first-layer ITO electrode 26a is placed. Thus, the whole electrode portion of the second-layer ITO electrode 26b can be visually recognized from the liquid crystal element 24 side. As a result, it is possible to apply a voltage to the liquid crystal element 24 from the whole electrode portion of the second-layer ITO electrode 26b. On the other hand, the first-layer ITO electrode 26a is placed farther from the liquid crystal element 24 than the second-layer ITO electrode 26b is placed. Thus, the electrode portions of the first-layer ITO electrode 26a can be visually recognized from the empty portion where the electrode portion of the second-layer ITO electrode 26b is not formed. As a result, it is possible to apply a voltage to the liquid crystal element 24 from the two island-shaped electrode portions and the electrode portion around the empty portion of the first-layer ITO electrode 26a. Particularly, according to the aberration correction element 16, it is possible to correct the coma aberration, preferably.

Particularly in the embodiment, the outgoing line portion 28 of the first-layer ITO electrode 26a is placed in the back of the second-layer ITO electrode 26b (i.e. far from the liquid crystal element 24). Thus, the outgoing line portion 28 cannot be visually recognized from the liquid crystal element 24 side. In other words, the second-layer ITO electrode 26b is placed between the outgoing line portion 28 of the first-layer ITO electrode 26a and the liquid crystal element 24. Moreover, to put it differently, the distance between the outgoing line portion 28 of the first-layer ITO electrode 26a and the liquid crystal element 24 is longer than the distance between the second-layer ITO electrode 26b and the liquid crystal element 24.

The structure of the outgoing line portion 28 will be explained in more detail, with reference to FIG. 5 which shows a IV—IV cross sectional view of FIG. 4. As shown in the cross sectional view on the upper side of FIG. 5, the outgoing line portion 28 of the first-layer ITO electrode 26a is placed in the further back of the second-layer ITO electrode 26b. Thus, a voltage is not applied from the outgoing line portion 28 to the liquid crystal element 24. Namely, in an area where the outgoing line portion 28 is placed, a voltage is applied to the liquid crystal element 24 from the second-layer ITO electrode 26b which is placed close to the liquid crystal element 24. Therefore, a voltage as shown on a graph on the lower side of FIG. 5 is applied to the liquid crystal element 24.

Incidentally, the ITO electrodes 26a and 26b which have a multilayer structure are mutually insulated by an insulating layer 29. Thus, it is possible to apply a different voltage to each of the ITO electrodes 26a and 26b.

Figure 6A:
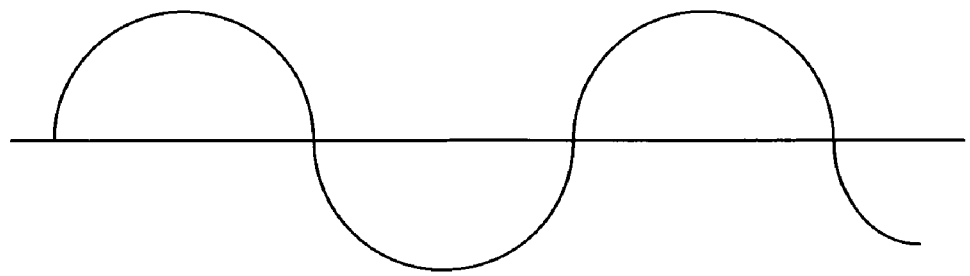
FIG. 6A and FIG. 6B are graphs conceptually showing an aberration which will be corrected by the aberration correction element in the embodiment and an aberration after the correction.
Figure 6B:
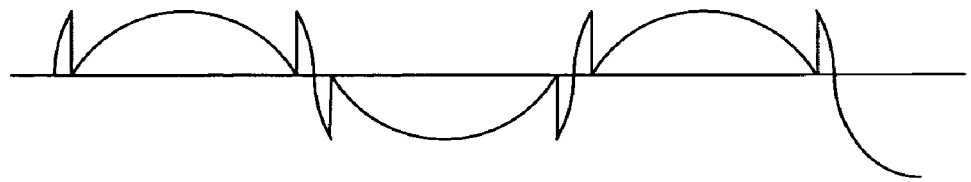

Then, by virtue of such an aberration correction element, aberrations as shown in FIG. 6A and FIG. 6B can be corrected. Namely, if the aberration shown in FIG. 6A occurs, the aberration is corrected as shown in FIG. 6B, by adjusting the extent of voltages which are applied to the ITO electrodes 26a and 26b, as occasion demands (e.g. by applying two or more different types of voltages).

Figure 7:
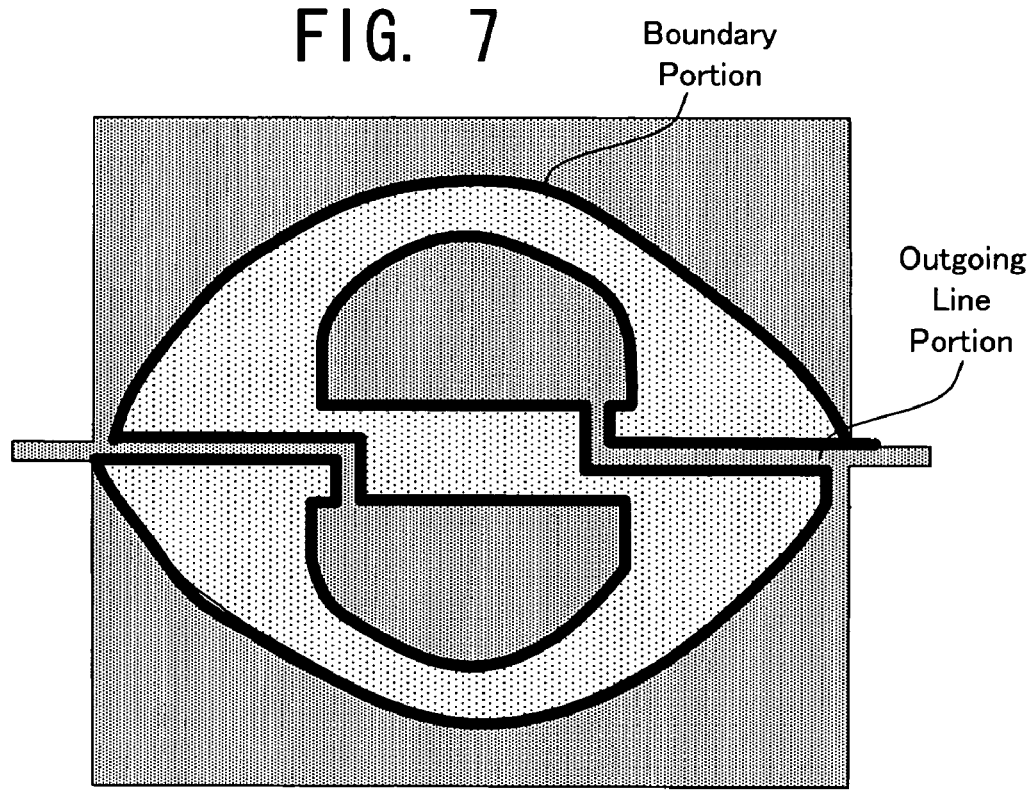
FIG. 7 is a plan view showing the shape of an electrode pattern of an aberration correction element in a comparison example.

Here, an aberration correction element in a comparison example will be explained with reference to FIG. 7 and FIG. 8. FIG. 7 shows the shape of an electrode pattern of the aberration correction element in the comparison example.

As shown in FIG. 7, in the aberration correction element in the comparison example, the ITO electrode is divided into a plurality of areas. Then, a boundary portion (or gap portion) of the ITO electrode which is divided into the plurality of areas is formed. Moreover, an outgoing line portion for applying a voltage to two island-shaped electrode portions, which are formed near the center, can be visually recognized from the liquid crystal element 24 side.

For that reason, a voltage cannot be applied to the liquid crystal element 24 from the boundary portion (or gap portion), which causes a phase difference in the gap portion. Particularly, if the phase difference is not an integral multiple of the wavelength of the laser light LB, the gap portion may act as a diffraction grating, with respect to the laser light LB which transmits thorough the aberration correction element.

Moreover, even in the outgoing line portion, although a voltage is originally to be applied to the liquid crystal element from the second-layer ITO electrode, a different voltage is applied from the outgoing line portion. This may cause an unnecessary phase difference with respect to the light which transmits through the outgoing line portion (or a liquid crystal element portion to which a voltage is applied from the outgoing line portion). These cause the deterioration of transmission efficiency, the deterioration of a reproduction performance, and the like, and are not preferable at all.

However, in the aberration correction element 16 in the embodiment, the outgoing line portion 28 is placed in the back of the second-layer ITO electrode 26b. Namely, the outgoing line portion 28 is not placed in a space between the liquid crystal element 24 and the second-layer ITO electrode 26b to which a predetermined voltage is originally to be applied. Thus, the presence of the outgoing line portion 28 is not a factor that causes the above-described unnecessary phase difference with respect to the laser light LB which transmits through the outgoing line portion. Thus, it is possible to preferably correct the aberration with respect to the laser light LB which transmits through the aberration correction element 16, which is of great advantage.

Moreover, the ITO electrode 26 is divided into not only a plurality of ITO electrodes, but also a plurality of ITO electrodes 26a and 26b having a multilayer structure. Thus, the above-described gap portion is not formed, and it is possible to effectively avoid such a disadvantage that the gap portion acts as a diffraction grating, with respect to the laser light LB, which are also of great advantage.

Incidentally, in the above-described embodiment, the ITO electrode 26 has two electrode layers; however, it may also have a plurality of electrode layers, such as three layers or more.

MODIFIED EXAMPLE

(1) First Modified Example

Figure 8A:
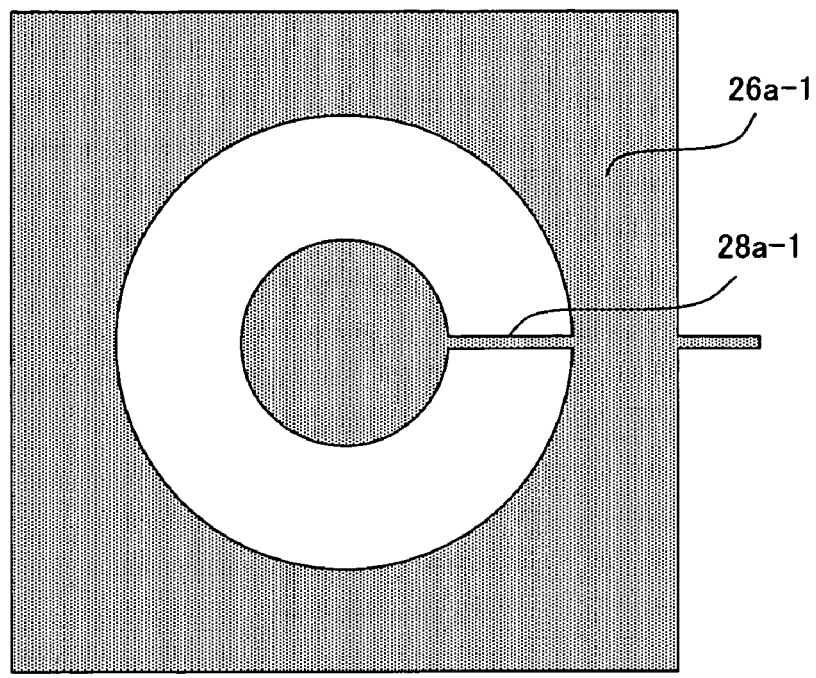
FIG. 8A and FIG. 8B are plan views showing the shapes of a plurality of ITO electrodes provided for an aberration correction element in a first modified example.
Figure 8B:
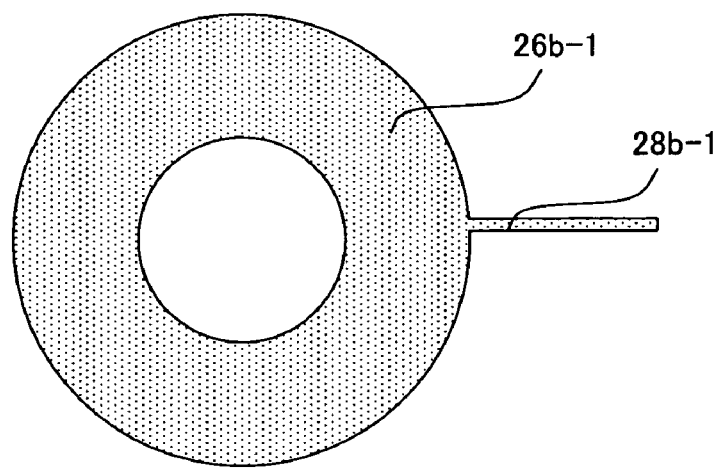
Figure 9:
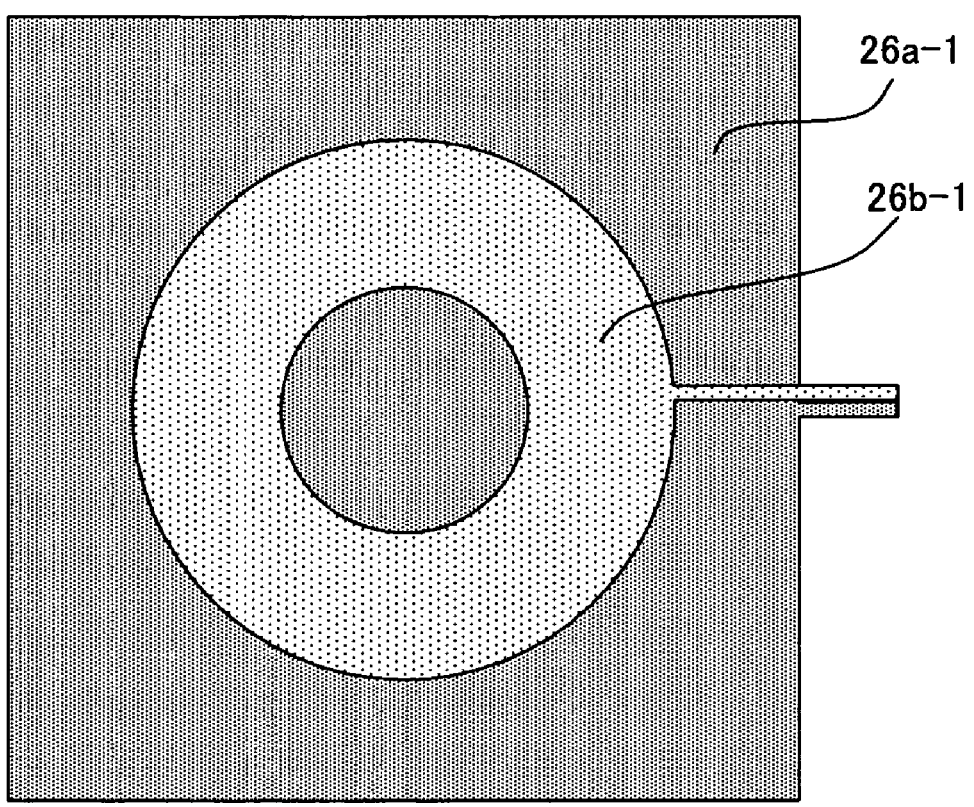
FIG. 9 is a plan view showing the shape of an electrode pattern constructed from the plurality of ITO electrodes.

With reference to FIG. 8 and FIG. 9, an aberration correction element in the first modified example will be explained. FIG. 8A and FIG. 8B show the shapes of a plurality of ITO electrodes provided for the aberration correction element in the first modified example. FIG. 9 shows the shape of an electrode pattern constructed from the plurality of ITO electrodes.

As shown in FIG. 8A, a first-layer ITO electrode 26a-1 has an electrode portion including an empty portion which is bored in a doughnut shape. The first-layer ITO electrode 26a-1 has an outgoing line 28a-1 for applying a voltage to the electrode portion which is on the inner side of the doughnut-shaped empty portion.

On the other hand, as shown in FIG. 8B, a second-layer ITO electrode 26b-1 is placed as opposed to the first-layer ITO electrode 26a-1. Namely, the second-layer ITO electrode 26b-1 has a doughnut-shaped electrode portion. The second-layer ITO electrode 26b-1 has an outgoing line 28b-1 for applying a voltage to the doughnut-shaped electrode portion.

The composition of the two ITO electrodes 26a-1 and 26b-1 realizes the shape of the electrode pattern as shown in FIG. 9. As shown in FIG. 9, the outgoing line portion 28a-1 of the first-layer ITO electrode 26a-1 is placed in the back of the second-layer ITO electrode 26b-1. Thus, the outgoing line portion 28a-1 is not visually recognized from the liquid crystal element 24 side. In other words, the second-layer ITO electrode 26b-1 is placed between the outgoing line portion 28a-1 and the liquid crystal element 24, so that the outgoing line portion 28a-1 is not visually recognized from the liquid crystal element 24 side. Therefore, it is possible to receive the same benefits as various benefits owned by the aberration correction element 16 in the above-described embodiment. Particularly, according to the aberration correction element in the first modified example, it is possible to correct the spherical aberration, preferably.

Incidentally, in this case, it is more preferable that the outgoing line portion 28b-1 for applying a voltage to the second-layer ITO electrode 26b-1 is placed in the further back of the first-layer ITO electrode 26a-1. By this, the outgoing line portion 28b-1 is not visually recognized from the liquid crystal element 24 side, and it is possible to correct the aberration, more preferably.

(2) Second Modified Example

Figure 10A:
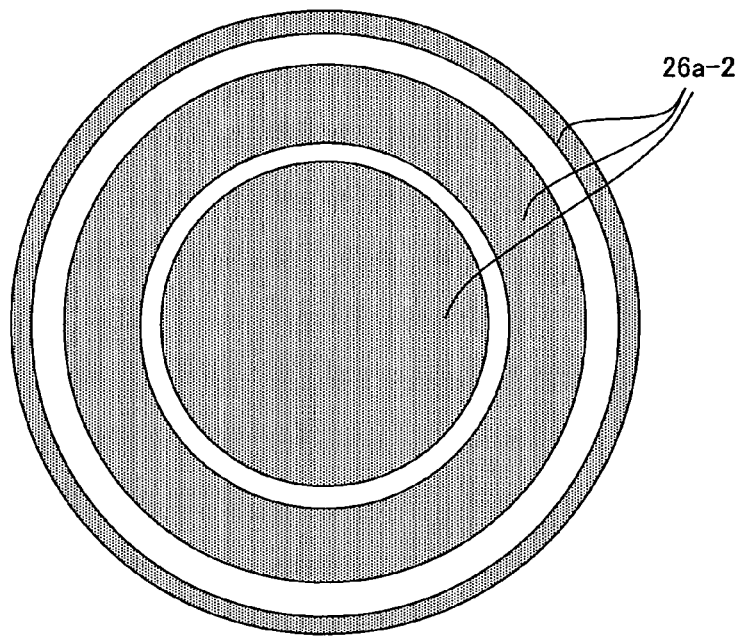
FIG. 10A and FIG. 10B are plan views showing the shape of an first-layer ITO electrode out of a plurality of ITO electrodes provided for an aberration correction element in a second modified example, and the shape of an insulating layer between the first-layer ITO electrode and a glass substrate.
Figure 10B:
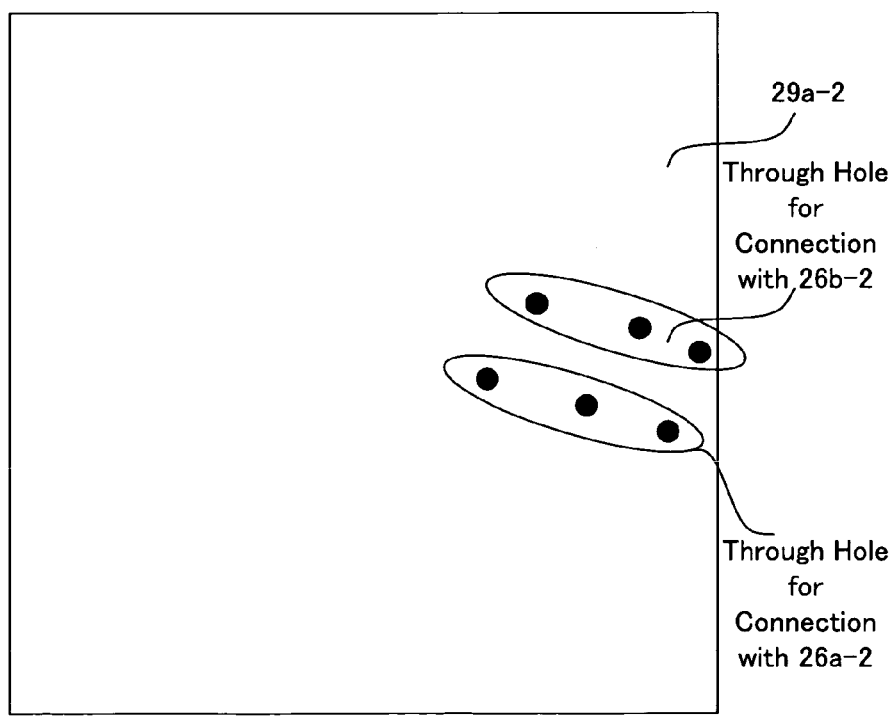
Figure 11A:
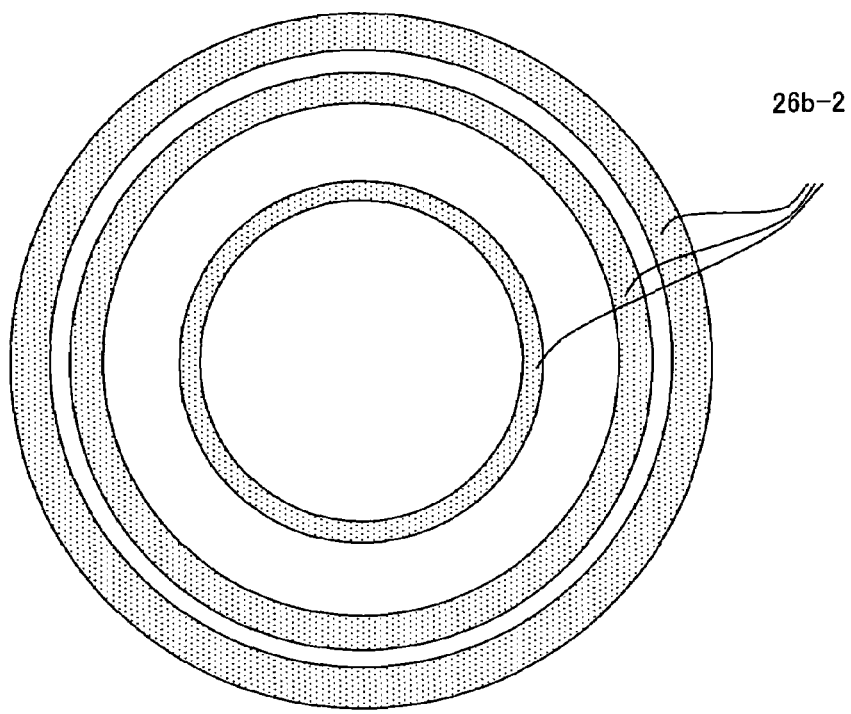
FIG. 11A and FIG. 11B are plan views showing the shape of a second-layer ITO electrode out of the plurality of ITO electrodes provided for the aberration correction element in the second modified example, and the shape of an insulating layer between the second-layer ITO electrode and the first-layer ITO electrode.
Figure 11B:
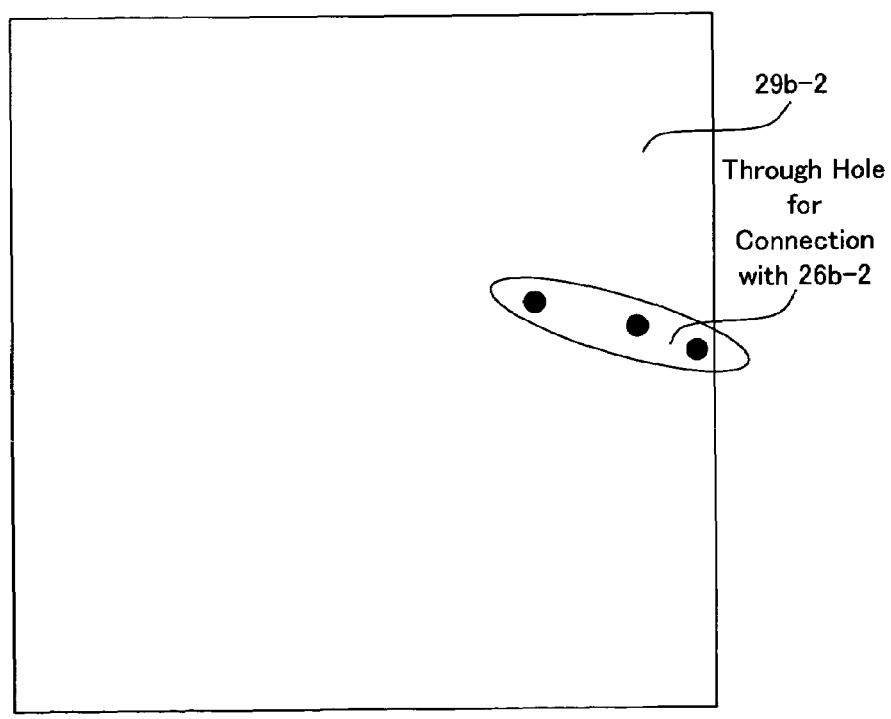
Figure 12:
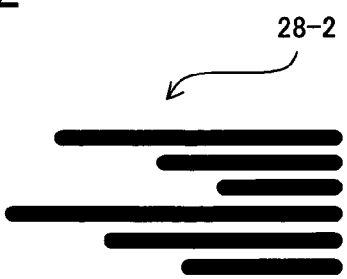
FIG. 12 is a plan view showing the shape of outgoing lines provided for the aberration correction element in the second modified example.
Figure 13:
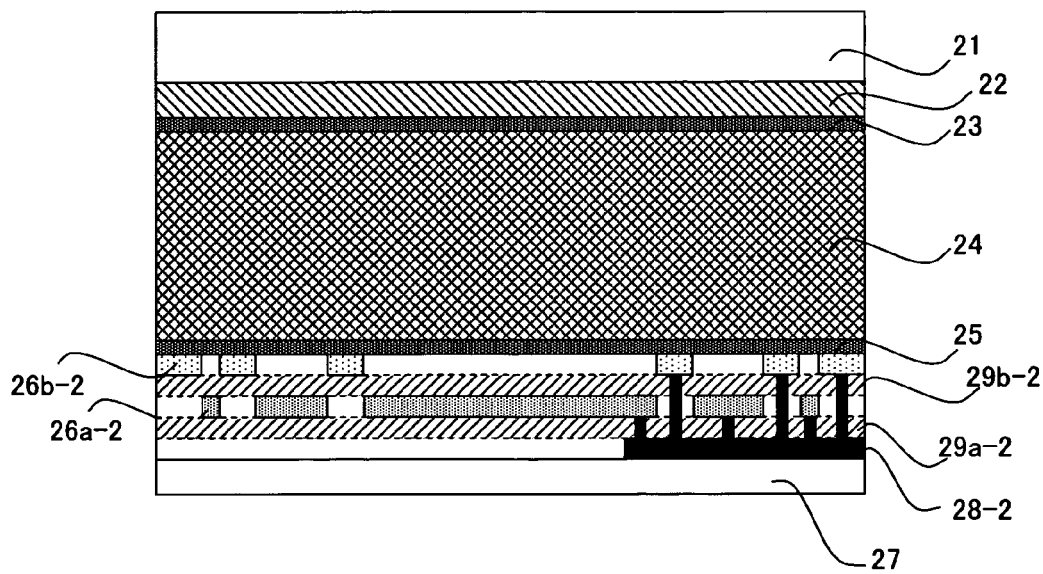
FIG. 13 is a cross sectional view showing the aberration correction element in the second modified example.

Next, with reference to FIG. 10 to FIG. 13, an aberration correction element in a second modified example will be explained. FIG. 10A and FIG. 10B show the shape of an first-layer ITO electrode out of a plurality of ITO electrodes provided for the aberration correction element in the second modified example, and the shape of an insulating layer between the first-layer ITO electrode and a glass substrate. FIG. 11A and FIG. 11B show the shape of a second-layer ITO electrode out of the plurality of ITO electrodes provided for the aberration correction element in the second modified example, and the shape of an insulating layer between the second-layer ITO electrode and the first-layer ITO electrode. FIG. 12 shows the shape of outgoing lines provided for the aberration correction element in the second modified example. FIG. 13 shows the aberration correction element in the second modified example.

As shown in FIG. 10A, a first-layer ITO electrode 26a-2 has a plurality of concentric doughnut-shaped electrode portions. Moreover, as shown in FIG. 10B, in an insulation layer 29a-2 placed between the first-layer ITO electrode 26a-2 and a glass substrate 27, there are formed a through hole for applying a voltage to the plurality of doughnut-shaped electrode portions of the first-layer ITO electrode 26a-2 and a through hole for applying a voltage to a plurality of doughnut-shaped electrode portions of a second-layer ITO electrode 26b-2. Namely, each of the electrode portions and an outgoing line portion 28-2 are connected through the through holes.

As shown in FIG. 11A, the second-layer ITO electrode 26b-2 also has the plurality of concentric doughnut-shaped electrode portions having an opposite arrangement to that of the first-layer ITO electrode 26a-2. Moreover, as shown in FIG. 11B, an insulation layer 29b-2 placed between the second-layer ITO electrode 26b-2 and the first-layer ITO electrode 26a-2, there is formed a through hole for applying a voltage to the plurality of doughnut-shaped electrode portions of the second-layer ITO electrode 26b-2.

Moreover, as shown in FIG. 12, as opposed to the case of the aberration correction element in the above-described embodiment and the above-described first modified example, the outgoing line portion 28–2 is provided as an independent layer which is different from each of the first-layer ITO electrode 26a-2 and the second-layer ITO electrode 26b-2. The outgoing line portion 28–2 is provided with six outgoing lines, each of which is intended to apply a voltage to respective one of the three doughnut-shaped electrode portions of the first-layer ITO electrode 26a-2 and the three doughnut-shaped electrode portions of the second-layer ITO electrode 26b-2. The outgoing line portion 28–2 is placed between the first-layer ITO electrode 26a-2 and the glass substrate 27.

The composition of the two ITO electrodes 26a-2 and 26b-2 realizes a concentrically segmentalized electrode pattern. Particularly, according to the aberration correction element in the second modified example, it is possible to correct the spherical aberration, preferably.

The cross sectional view of the aberration correction element in the second modified example is shown in FIG. 13. As shown in FIG. 13, the outgoing line portion 28–2 is placed farther from the liquid crystal element 24 than the first-layer ITO electrode 26a-2 and the second-layer ITO electrode 26b-2 are placed. Namely, at least one of the first-layer ITO electrode 26a-2 and the second-layer ITO electrode 26b-2 is placed between the outgoing line portion 28–2 and the liquid crystal element 24. In other words, the outgoing line portion 28–2 is not placed in a space between the liquid crystal element 24 and the first-layer ITO electrode 26a-1 to which a predetermined voltage is originally to be applied, or in a space between the liquid crystal element 24 and the second-layer ITO electrode 26b-2. Thus, a voltage is not applied to the liquid crystal element 24 from the outgoing line portion 28–2, and it is possible to receive the above-described various benefits.

In addition, in the second modified example, it is possible to separately produce the outgoing line portion 28–2, the first-layer ITO electrode 26a-2 and the second-layer ITO electrode 26b-2, respectively. Therefore, there is also such an advantage that the yield of the aberration correction element can be improved as a whole.

(3) Third Modified Example

Figure 14:
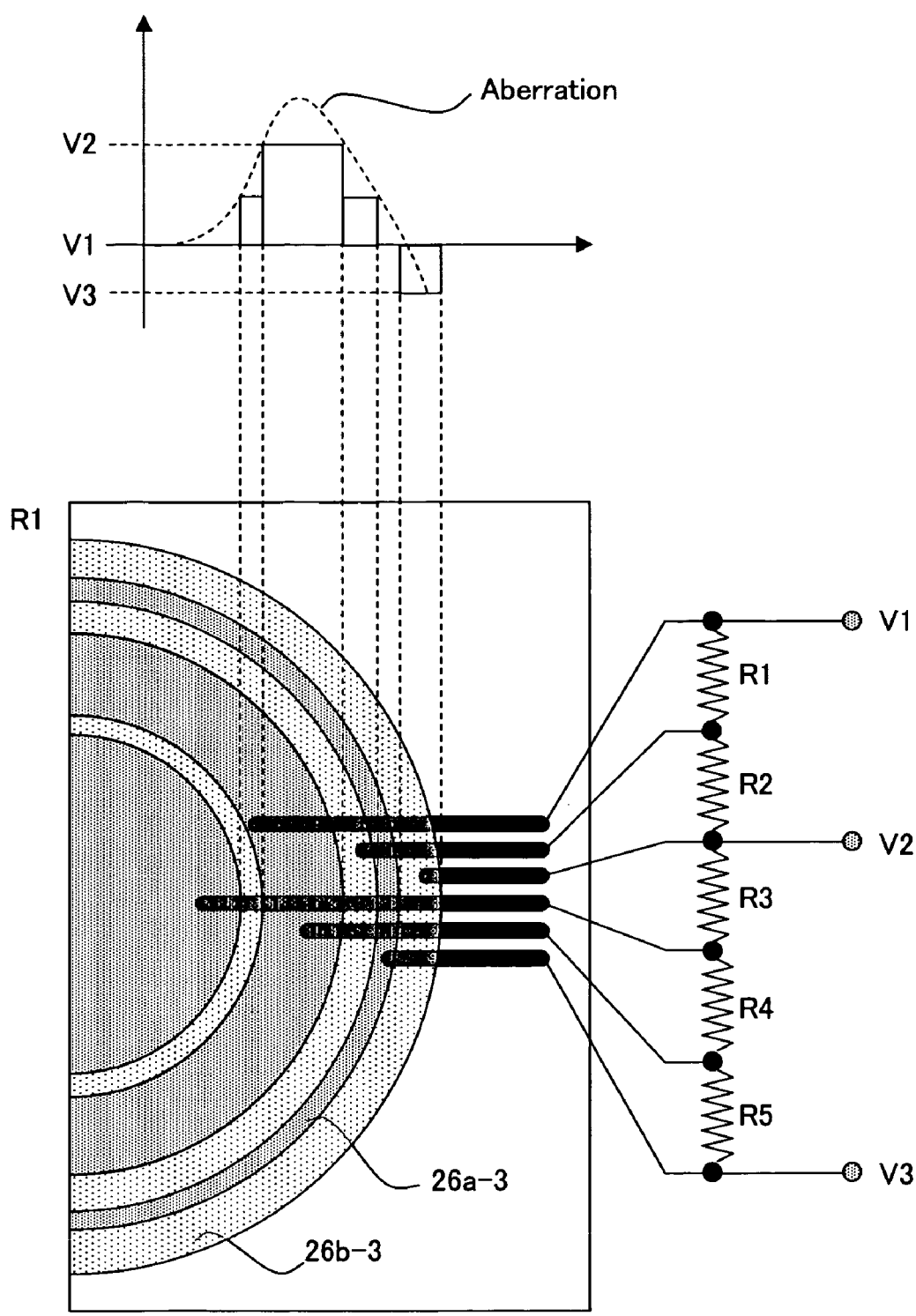
FIG. 14 is a plan view showing one portion of an aberration correction element in a third modified example.

With reference to FIG. 14, an aberration correction element in the third modified example will be explained. FIG. 14 shows one portion of the aberration correction element in the third modified example.

As shown in FIG. 14, the aberration correction element in the third modified example is provided with ITO electrodes 26a-3 and 26b-3 which have the same structure as that of the ITO electrodes 26a-2 and 26b-2 in the second modified example.

Particularly in the third modified example, a plurality of outgoing lines are connected by predetermined resistances R1 to R5. Then, voltages V1, V2, and V3 are applied from three electrode terminals which are connected to three of the plurality of outgoing lines respectively. Namely, by using a voltage drop in the resistances R1 to R5, a different voltage can be applied to each of the outgoing lines even if voltages are applied to the outgoing lines from a smaller number of electrode terminals than the actual number of the outgoing lines, which is of great advantage. The resistances R1 to R5 may be formed on the glass substrate by using a material (such as ITO) used for the outgoing lines. Moreover, the resistances R1 to R5 may be placed on the outer side (the glass substrate 27 side) of the first-layer ITO electrode 26a-3 and the second-layer ITO electrode 26b-3 (i.e. as shown in FIG. 14), or on the inner side (the opposite side of the glass substrate 27) of them. If the resistances are placed on the inner side, the resistances are formed as same as the outgoing lines 28 described above. Thus, the voltages in the resistance portions are not applied to the liquid crystal element 24, on the basis of the same principle as that the voltages on the outgoing lines 28 are not applied to the liquid crystal element 24.

By the operation of the aberration correction element in the third modified example, it is possible to make an aberration correction, as shown in a solid line on the graph on the upper side of FIG. 14. Therefore, it is possible to preferably correct the spherical aberration, as shown in a dotted line on the graph on the upper side of FIG. 14.

Incidentally, in the above-described embodiment and in the above-described first to third modified example, only the ITO electrode 26 is provided with the plurality of electrode portions aligned along the optical axis. Obviously, the ITO electrode 22 may also adopt the same various embodiments (i.e. the same various constructions).

(Information Equipment)

Figure 15:
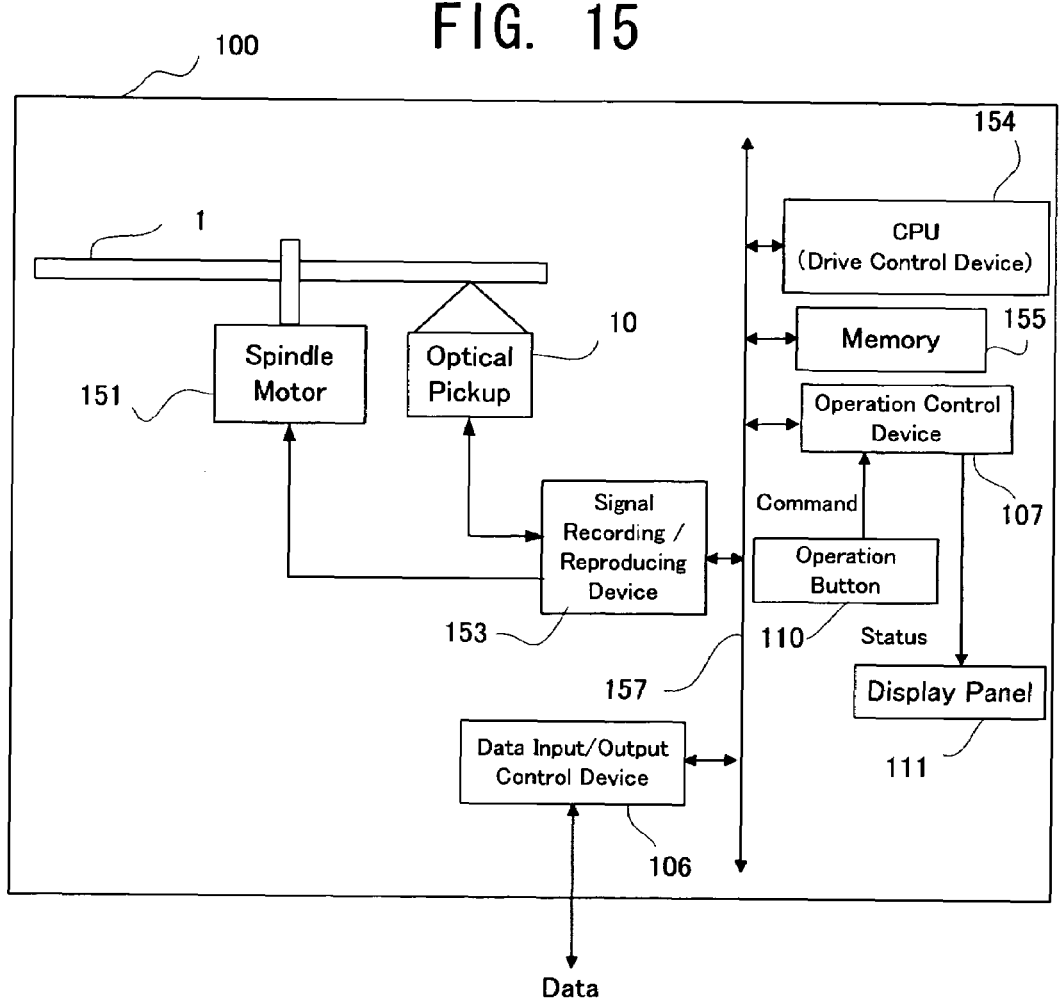
FIG. 15 is a block diagram showing an information recording/reproducing apparatus provided with the aberration correction element in the embodiment.

Next, with reference to FIG. 15, an information recording/reproducing apparatus provided with the aberration correction element in the embodiment (i.e. an embodiment of an information equipment in the present invention) will be explained briefly. FIG. 15 shows an information recording/reproducing apparatus 100 provided with the aberration correction element in the embodiment. Incidentally, the information recording/reproducing apparatus 100 has a function of recording the record data onto the optical disc 1 and a function of reproducing the record data recorded on the optical disc 1.

As shown in FIG. 15, the information recording/reproducing apparatus 100 records information onto the optical disc 1 and reads the information recorded on the optical disc 1, under the control of a CPU (Central Processing Unit) 154.

The information recording/reproducing apparatus 100 is provided with: the optical disc 1; the above-described optical pickup 10; a spindle motor 151; a signal recording/reproducing device 153; the CPU (drive control device) 154; a memory 155; a data input/output control device 106; an operation control device 107; an operation button 110; a display panel 111; and a bus 157.

The spindle motor 151 is intended to rotate and stop the optical disc 1, and operates in accessing the optical disc 1. More specifically, the spindle motor 151 is constructed to rotate and stop the optical disc 1 at a predetermined speed while receiving spindle servo by a not-illustrated servo unit or the like.

The optical pickup 10 performs the recording/reproducing with respect to the optical disc 1, and has the above-described various constructions. More specifically, the optical pickup 10 irradiates the optical disc 1 with the laser light LB, as reading light with a first power upon reproduction, and as writing light with a second power upon recording, with it modulated.

The signal recording/reproducing device 153 performs the recording/reproducing with respect to the optical disc 1 by controlling the optical pickup 10 and the spindle motor 151.

The memory 155 is used in the all the data processing on the information recording/reproducing apparatus 100, including a buffer area for the record/reproduction data, an area used as an intermediate buffer when data is converted into the data that can be used on the signal recording/reproducing device 153, and the like. Moreover, the memory 155 is provided with: a Read Only Memory (ROM) area into which a program for performing an operation as a recording device is stored; a Random Access Memory (RAM) area into which the compression/decompression of video data and a parameter required for the program operation is temporarily stored; and the like.

The CPU (drive control device) 154 is connected to the signal recording/reproducing device 153 and the memory 155 via the bus 157, and controls the entire information recording/reproducing apparatus 100 by giving instructions to various devices. In general, software for operating the CPU 154 is stored in the memory 155.

The data input/output control device 106 controls the data input/output from the outside with respect to the information recording/reproducing apparatus 100, and stores the data into or extracts it from the data buffer on the memory 155. If the data input/output is a video signal, the data received from the outside is compressed (encoded) into a MPEG format, and then outputted to the memory 155, at the time of data input. At the time of data output, the data in the MPEG format received from the memory 155 is decompressed (decoded), and then outputted to the outside.

The operation control device 107 performs the reception of the operation instruction and display with respect to the information recording/reproducing apparatus 100. The operation control device 107 sends the instruction of recording or reproducing by using the operation bottom 110, to the CPU 154. Then, the operation control device 107 outputs the operational condition of the information recording/reproducing apparatus 100, such as during recording and during reproduction, to the display panel 111, such as a fluorescent tube.

As described above, one example of the information recording/reproducing apparatus 100 is a recording device for recording/reproducing the video in household equipment. The recording device records a video signal from a broadcast receiving tuner or from an external connection terminal onto a disc, and outputs the video signal reproduced from the disc to an external display device, such as a television. The operation as the recording device is performed by executing the program, which is stored in the memory 155, on the CPU 154.

Particularly in the embodiment, the optical pickup 10 is provided with the above-described aberration correction element 16. Therefore, it is possible to preferably correct the aberration with respect to the laser light LB emitted from a laser apparatus, as described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-206176 filed on Jul. 13, 2004 including the specification, claims, drawings and summary is incorporated herein by reference in its entirety.

What is claimed is:

1. An aberration correction element for correcting an aberration, said aberration correction element being placed along an optical axis of light in a middle of an optical path between a light source and an optical element for focusing the light emitted from the light source on an information recording medium, said aberration correction element comprising:
a liquid crystal element;
a first electrode;
a plurality of second electrodes which mutually face said first electrode, with said liquid crystal element being sandwiched between said first electrode and said second electrodes, and which are arranged in a form of multiple layers in a direction of the optical axis; and
a plurality of outgoing lines for individually applying a voltage to said plurality of second electrodes,
at least one of said plurality of second electrodes being placed between one of said outgoing lines for applying the voltage to another second electrode other than one second electrode which is placed on the closest side to said liquid crystal element, out of said plurality of second electrodes, and at least one portion of said liquid crystal element which faces said one of said outgoing lines for applying the voltage to the another second electrode in the direction of the optical axis.

2. The aberration correction element according to claim 1, wherein a distance between another outgoing line other than one outgoing line that is intended to apply the voltage to the one second electrode, out of said plurality of outgoing lines, and said liquid crystal element is longer than a distance between at least one of said plurality of second electrodes and said liquid crystal element.

3. The aberration correction element according to claim 1, wherein at least one of said plurality of second electrodes is placed between each of said plurality of outgoing lines and at least one portion of said liquid crystal element which faces the each of said outgoing lines in the direction of the optical axis.

4. The aberration correction element according to claim 1, wherein a distance between each of said plurality of outgoing lines and said liquid crystal element is longer than a distance between said plurality of second electrodes and said liquid crystal element.

5. The aberration correction element according to claim 1, wherein at least one of said plurality of second electrodes is unified with one of the outgoing lines for applying the voltage to the at least one of said second electrodes.

6. The aberration correction element according to claim 1, wherein an insulating layer is placed between said plurality of second electrodes.

7. The aberration correction element according to claim 6, wherein a through hole for connecting each of said plurality of second electrodes with one of said plurality of outgoing lines corresponding to each of said plurality of second electrodes is formed in the insulating layer.

8. The aberration correction element according to claim 1, wherein said plurality of second electrodes are individually aligned without a void for each other in the direction perpendicular to the optical axis.

9. The aberration correction element according to claim 1, wherein at least two of said plurality of outgoing lines are electrically connected by a resistance line having a predetermined resistance value.

10. An aberration correction element for correcting an aberration, said aberration correction element being placed along an optical axis of light in a middle of an optical path between a light source and an optical element for focusing the light emitted from the light source on an information recording medium,
said aberration correction element comprising:
a liquid crystal element;
a first electrode;
a plurality of second electrodes which mutually face said first electrode, with said liquid crystal element being sandwiched between said first electrode and said second electrodes, and which are arranged in a form of multiple layers in a direction of the optical axis; and
a plurality of outgoing lines for individually applying a voltage to said plurality of second electrodes,
one of said outgoing lines for applying the voltage to another second electrode other than one second electrode which is placed on the closest side to said liquid crystal element, out of said plurality of second electrodes, being formed in a space other than a space between at least one portion of each of said plurality of second electrodes where the voltage is to be applied and said first electrode.

11. The aberration correction element according to claim 10, wherein each of said plurality of outgoing lines is formed in a space other than between at least one portion of each of said plurality of second electrodes where the voltage is to be applied and said first electrode.

12. The aberration correction element according to claim 10, wherein at least one of said plurality of second electrodes is placed between said one of said outgoing lines for applying the voltage to the another second electrode and at least one portion of said liquid crystal element which faces said one of said outgoing lines for applying the voltage to the another second electrode in the direction of the optical axis.

13. The aberration correction element according to claim 10, wherein a distance between another outgoing line other than one outgoing line that is intended to apply the voltage to the one second electrode, out of said plurality of outgoing lines, and said liquid crystal element is longer than a distance between at least one of said plurality of second electrodes and said liquid crystal element.

14. The aberration correction element according to claim 10, wherein at least one of said plurality of second electrodes is placed between each of said plurality of outgoing lines and at least one portion of said liquid crystal element which faces the each of said outgoing lines in the direction of the optical axis.

15. The aberration correction element according to claim 10, wherein a distance between each of said plurality of outgoing lines and said liquid crystal element is longer than a distance between said plurality of second electrodes and said liquid crystal element.

16. The aberration correction element according to claim 10, wherein at least one of said plurality of second electrodes is unified one of with the outgoing lines for applying the voltage to the at least one of said second electrodes.

17. The aberration correction element according to claim 10, wherein an insulating layer is placed between said plurality of second electrodes.

18. The aberration correction element according to claim 17, wherein a through hole for connecting each of said plurality of second electrodes with one of said plurality of outgoing lines corresponding to each of said plurality of second electrodes is formed in the insulating layer.

19. The aberration correction element according to claim 10, wherein said plurality of second electrodes are individually aligned without a void for each other in the direction perpendicular to the optical axis.

20. The aberration correction element according to claim 10, wherein at least two of said plurality of outgoing lines are electrically connected by a resistance line having a predetermined resistance value.

21. An aberration correction element for correcting an aberration, said aberration correction element being placed along an optical axis of light in a middle of an optical path between a light source and an optical element for focusing the light emitted from the light source on an information recording medium,
said aberration correction element comprising:
a liquid crystal element;
a plurality of first electrodes which are placed on a side of a front surface of said liquid crystal element and which are arranged in a form of multiple layers in a direction of the optical axis;
a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and
a plurality of outgoing lines for individually applying a voltage to said plurality of first electrodes and said plurality of second electrodes,
at least one of said plurality of first electrodes being placed between one of said outgoing lines for applying the voltage to another first electrode other than one first electrode which is placed on the closest side to the front surface of said liquid crystal element, out of said plurality of first electrodes, and at least one portion of said liquid crystal element which faces said one of said outgoing lines for applying the voltage to the another first electrode in the direction of the optical axis, and
at least one of said plurality of second electrodes being placed between another one of said outgoing lines for applying the voltage to another second electrode other than one second electrode which is placed on the closest side to the rear surface of said liquid crystal element, out of said plurality of second electrodes, and at least one portion of said liquid crystal element which faces said another one of said outgoing lines for applying the voltage to the another second electrode in the direction of the optical axis.

22. An aberration correction element for correcting an aberration, said aberration correction element being placed along an optical axis of light in a middle of an optical path between a light source and an optical element for focusing the light emitted from the light source on an information recording medium, said aberration correction element comprising:
a liquid crystal element;
a plurality of first electrodes which are placed on a side of a front surface of said liquid crystal element and which are arranged in a form of multiple layers in a direction of the optical axis;
a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and
a plurality of outgoing lines for individually applying a voltage to said plurality of first electrodes and said plurality of second electrodes,
one of said outgoing lines for applying the voltage to another first electrode other than one first electrode which is placed on the closest side to the front surface of said liquid crystal element, out of said plurality of first electrodes, being formed in a space other than a space between at least one portion of each of said plurality of first electrodes where the voltage is to be applied and each of said plurality of second electrodes, and
another one of said outgoing lines for applying the voltage to another second electrode other than one second electrode which is placed on the closest side to the rear surface of said liquid crystal element, out of said plurality of second electrodes, being formed in a space other than a space between at least one portion of each of said plurality of second electrodes where the voltage is to be applied and each of said plurality of first electrodes.

23. An optical pickup comprising:
a light source;
an aberration correction element for correcting an aberration, said aberration correction element being placed along an optical axis of light in a middle of an optical path between the light source and an optical element for focusing the light emitted from the light source on an information recording medium, said aberration correction element comprising: a liquid crystal element; a first electrode; a plurality of second electrodes which mutually face said first electrode, with said liquid crystal element being sandwiched between said first electrode and said second electrodes, and which are arranged in a form of multiple layers in a direction of the optical axis; and a plurality of outgoing lines for individually applying a voltage to said plurality of second electrodes, at least one of said plurality of second electrodes being placed between one of said outgoing lines for applying the voltage to another second electrode other than one second electrode which is placed on the closest side to said liquid crystal element, out of said plurality of second electrodes, and at least one portion of said liquid crystal element which faces said one of said outgoing lines for applying the voltage to the another second electrode in the direction of the optical axis; and
a detection element for detecting reflected light of the light from the information recording medium, the light being emitted from the light source, being transmitted through the aberration correction element and being irradiated onto the information recording medium.

24. An optical pickup comprising:
a light source;
an aberration correction element for correcting an aberration, said aberration correction element being placed along an optical axis of light in a middle of an optical path between the light source and an optical element for focusing the light emitted from the light source on an information recording medium, said aberration correction element comprising: a liquid crystal element; a first electrode; a plurality of second electrodes which mutually face said first electrode, with said liquid crystal element being sandwiched between said first electrode and said second electrodes, and which are arranged in a form of multiple layers in a direction of the optical axis; and a plurality of outgoing lines for individually applying a voltage to said plurality of second electrodes,
one of said outgoing lines for applying the voltage to another second electrode other than one second electrode which is placed on the closest side to said liquid crystal element, out of said plurality of second electrodes, being formed in a space other than between at least one portion of each of said plurality of second electrodes where the voltage is to be applied and said first electrode; and
a detection element for detecting the reflected light of the light from the information recording medium, the light being emitted from the light source, being transmitted through the aberration correction element and being irradiated onto the information recording medium.

25. An optical pickup comprising:
a light source;
an aberration correction element for correcting an aberration, said aberration correction element being placed along an optical axis of light in a middle of an optical path between the light source and an optical element for focusing the light emitted from the light source on an information recording medium, said aberration correction element comprising: a liquid crystal element; a plurality of first electrodes which are placed on a side of a front surface of said liquid crystal element and which are arranged in a form of multiple layers in a direction of the optical axis; a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and a plurality of outgoing lines for individually applying a voltage to said plurality of first electrodes and said plurality of second electrodes, at least one of said plurality of first electrodes being placed between one of said outgoing lines for applying the voltage to another first electrode other than one first electrode which is placed on the closest side to the front surface of said liquid crystal element, out of said plurality of first electrodes, and at least one portion of said liquid crystal element which faces said one of said outgoing lines for applying the voltage to the another first electrode in the direction of the optical axis, at least one of said plurality of second electrodes being placed between another one of said outgoing lines for applying the voltage to another second electrode other than one second electrode which is placed on the closest side to the rear surface of said liquid crystal element, out of said plurality of second electrodes, and at least one portion of said liquid crystal element which faces said another one of said outgoing lines for applying the voltage to the another second electrode in the direction of the optical axis; and a detection element for detecting reflected light of the light from the information recording medium, the light being emitted from the light source, being transmitted through the aberration correction element and being irradiated onto the information recording medium.

26. An optical pickup comprising:

a light source;

an aberration correction element for correcting an aberration, said aberration correction element being placed along an optical axis of light in a middle of an optical path between the light source and an optical element for focusing the light emitted from the light source on an information recording medium, said aberration correction element comprising: a liquid crystal element; a plurality of first electrodes which are placed on a side of a front surface of said liquid crystal element and which are arranged in a form of multiple layers in a direction of the optical axis; a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and a plurality of outgoing lines for individually applying a voltage to said plurality of first electrodes and said plurality of second electrodes, one of said outgoing lines for applying the voltage to another first electrode other than one first electrode which is placed on the closest side to the front surface of said liquid crystal element, out of said plurality of first electrodes, being formed in a space other than between at least one portion of each of said plurality of first electrodes where the voltage is to be applied and each of said plurality of second electrodes, another one of said outgoing lines for applying the voltage to another second electrode other than one second electrode which is placed on the closest side to the rear surface of said liquid crystal element, out of said plurality of second electrodes, being formed in a space other than between at least one portion of each of said plurality of second electrodes where the voltage is to be applied and each of said plurality of first electrodes; and a detection element for detecting the reflected light of the light from the information recording medium, the light being emitted from the light source, being transmitted through the aberration correction element and being irradiated onto the information recording medium.

27. An information equipment comprising:

an optical pickup comprising a light source, an aberration correction element for correcting an aberration, said aberration correction element being placed along an optical axis of light in a middle of an optical path between the light source and an optical element for focusing the light emitted from the light source on an information recording medium, said aberration correction element comprising: a liquid crystal element; a first electrode; a plurality of second electrodes which mutually face said first electrode, with said liquid crystal element being sandwiched between said first electrode and said second electrodes, and which are arranged in a form of multiple layers in a direction of the optical axis; and a plurality of outgoing lines for individually applying a voltage to said plurality of second electrodes, at least one of said plurality of second electrodes being placed between one of said outgoing lines for applying the voltage to another second electrode other than one second electrode which is placed on the closest side to said liquid crystal element, out of said plurality of second electrodes, and at least one portion of said liquid crystal element which faces said one of said outgoing lines for applying the voltage to the another second electrode in the direction of the optical axis; and a detection element for detecting reflected light of the light from the information recording medium, the light being emitted from the light source, being transmitted through the aberration correction element and being irradiated onto the information recording medium; and a recording/reproducing device for performing at least one of recording or reproduction of data by irradiating a recording medium with the light transmitted through the aberration correction element from the light source and/or detecting the reflected light on the detection element.

28. An information equipment comprising:

an optical pickup comprising a light source, an aberration correction element for correcting an aberration, said aberration correction element being placed along an optical axis of light in a middle of an optical path between the light source and an optical element for focusing the light emitted from the light source on an information recording medium, said aberration correction element comprising: a liquid crystal element; a first electrode; a plurality of second electrodes which mutually face said first electrode, with said liquid crystal element being sandwiched between said first electrode and said second electrodes, and which are arranged in a form of multiple layers in a direction of the optical axis; and a plurality of outgoing lines for individually applying a voltage to said plurality of second electrodes, one of said outgoing lines for applying the voltage to another second electrode other than one second electrode which is placed on the closest side to said liquid crystal element, out of said plurality of second electrodes, being formed in a space other than between at least one portion of each of said plurality of second electrodes where the voltage is to be applied and said first electrode; and a detection element for detecting reflected light of the light from the information recording medium, the light being emitted from the light source, being transmitted through the aberration correction element and being irradiated onto the information recording medium; and a recording/reproducing device for performing at least one of recording or reproduction of data by irradiating a recording medium with the light transmitted through the aberration correction element from the light source and/or detecting the reflected light on the detection element.

29. An information equipment comprising:

an optical pickup comprising a light source, an aberration correction element for correcting an aberration, said aberration correction element being placed along an optical axis of light in a middle of an optical path between the light source and an optical element for focusing the light emitted from the light source on an information recording medium, said aberration correction element comprising: a liquid crystal element; a plurality of first electrodes which are placed on a side of a front surface of said liquid crystal element and which are arranged in a form of multiple layers in a direction of the optical axis; a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and a plurality of outgoing lines for individually applying a voltage to said plurality of first electrodes and said plurality of second electrodes, at least one of said plurality of first electrodes being placed between one of said outgoing lines for applying the voltage to another first electrode other than one first electrode which is placed on the closest side to the front surface of said liquid crystal element, out of said plurality of first electrodes, and at least one portion of said liquid crystal element which faces said one of said outgoing lines for applying the voltage to the another first electrode in the direction of the optical axis, at least one of said plurality of second electrodes being placed between another one of said outgoing lines for applying the voltage to another second electrode other than one second electrode which is placed on the closest side to the rear surface of said liquid crystal element, out of said plurality of second electrodes, and at least one portion of said liquid crystal element which faces said another one of said outgoing lines for applying the voltage to the another second electrode in the direction of the optical axis; and a detection element for detecting reflected light of the light from the information recording medium, the light being emitted from the light source, being transmitted through the aberration correction element and being irradiated onto the information recording medium; and a recording/reproducing device for performing at least one of recording or reproduction of data by irradiating a recording medium with the light transmitted through the aberration correction element from the light source and/or detecting the reflected light on the detection element.

30. An information equipment comprising:

an optical pickup comprising a light source, an aberration correction element for correcting an aberration, said aberration correction element being placed along an optical axis of light in a middle of an optical path between the light source and an optical element for focusing the light emitted from the light source on an the information recording medium, said aberration correction element comprising: a liquid crystal element; a plurality of first electrodes which are placed on a side of a front surface of said liquid crystal element and which are arranged in a form of multiple layers in a direction of the optical axis; a plurality of second electrodes which are placed on a side of a rear surface of said liquid crystal element so as to sandwich said liquid crystal element with said plurality of first electrodes, which mutually face said plurality of first electrodes, and which are arranged in a form of multiple layers in the direction of the optical axis; and a plurality of outgoing lines for individually applying a voltage to said plurality of first electrodes and said plurality of second electrodes, one of said outgoing lines for applying the voltage to another first electrode other than one first electrode which is placed on the closest side to the front surface of said liquid crystal element, out of said plurality of first electrodes, being formed in a space other than between at least one portion of each of said plurality of first electrodes where the voltage is to be applied and each of said plurality of second electrodes, another one of said outgoing lines line for applying the voltage to another second electrode other than one second electrode which is placed on the closest side to the rear surface of said liquid crystal element, out of said plurality of second electrodes, being formed in a space other than between at least one portion of each of said plurality of second electrodes where the voltage is to be applied and each of said plurality of first electrodes; and a detection element for detecting reflected light of the light from the information recording medium, the light being emitted from the light source, being transmitted through the aberration correction element and being irradiated onto the information recording medium; and a recording/reproducing device for performing at least one of recording or reproduction of data by irradiating a recording medium with the light through the aberration correction element from the light source and/or detecting the reflected light on the detection element.

31. A light aberration correction element comprising:

a liquid crystal element; and respective electrode structures arranged on opposite sides of the liquid crystal element, at least one of the electrode structures comprising spaced apart first and second electrodes each connected to a respective voltage line, wherein the one of the first and second electrodes nearer to the liquid crystal element is physically disposed between the liquid crystal element and the voltage line for the one of the first and second electrodes farther from the liquid crystal element.

32. The light aberration correction element according to claim 31, further comprising:

an insulating layer disposed in the space between the first and second electrodes.

33. The light aberration correction element according to claim 31, wherein the first and second electrodes comprise indium tin oxide (ITO) electrodes.

34. The light aberration correction element according to claim 31, wherein the first electrode includes one or more openings formed therein and the second electrode includes at least one electrode portion formed in correspondence with the one or more openings.

35. The light aberration correction element according to claim 31, wherein both of the electrode structures comprise spaced apart first and second electrodes each connected to a respective voltage line.

36. An optical pickup comprising a light source and the light aberration correction element according to claim 31.

37. Information equipment comprising the optical pickup according to claim 36 and a recording device for recording information on an information medium using light from the optical pickup.

38. Information equipment comprising the optical pickup according to claim 36 and a reproducing device for reproducing information recorded on an information medium using light from the optical pickup.

* * * * *